US007364480B2

(12) United States Patent
Ito et al.

(10) Patent No.: US 7,364,480 B2
(45) Date of Patent: Apr. 29, 2008

(54) ENGINE OUTPUT CONTROL SYSTEM FOR WATER JET PROPULSION BOAT

(75) Inventors: Kazumasa Ito, Shizuoka-ken (JP); Yoshimasa Kinoshita, Shizuoka-ken (JP)

(73) Assignee: Yamaha Marine Kabushiki Kaisha, Shizouka (JP)

( * ) Notice: Subject to any disclaimer, the term of this patent is extended or adjusted under 35 U.S.C. 154(b) by 81 days.

(21) Appl. No.: 11/169,374

(22) Filed: Jun. 29, 2005

(65) Prior Publication Data

US 2005/0287886 A1 Dec. 29, 2005

(30) Foreign Application Priority Data

Jun. 29, 2004 (JP) ............................. 2004-191154

(51) Int. Cl.

| | |
|---|---|
| ***B63H 21/22*** | (2006.01) |
| *B63H 11/107* | (2006.01) |
| *B63H 25/04* | (2006.01) |
| *B63H 25/00* | (2006.01) |
| *B63H 1/02* | (2006.01) |
| *B60W 10/04* | (2006.01) |

(52) U.S. Cl. ............................. 440/1; 440/40; 440/84; 440/87; 114/144 R; 114/144 RE; 114/144 E

(58) Field of Classification Search .................... 440/1, 440/38, 40–43, 84, 87; 114/144 R, 144 RE, 114/144 E; 701/21

See application file for complete search history.

(56) References Cited

U.S. PATENT DOCUMENTS

| | | | |
|---|---|---|---|
| 3,183,879 | A | 5/1965 | Heidner |
| 4,423,630 | A | 1/1984 | Morrison |
| 4,445,473 | A | 5/1984 | Matsumoto |
| 4,492,195 | A | 1/1985 | Takahashi et al. |
| 4,556,005 | A | 12/1985 | Jackson |
| 4,767,363 | A | 8/1988 | Uchida et al. |
| 4,949,662 | A | 8/1990 | Kobayashi |
| 4,961,396 | A | 10/1990 | Sasagawa |
| 4,971,584 | A | 11/1990 | Inoue et al. |
| 4,972,792 | A | 11/1990 | Yokoyama et al. |
| 4,989,533 | A | 2/1991 | Horiuchi |
| 5,094,182 | A | 3/1992 | Simner |

(Continued)

FOREIGN PATENT DOCUMENTS

| | | |
|---|---|---|
| CA | 2271332 | 2/2000 |

(Continued)

OTHER PUBLICATIONS

Co-pending U.S. Appl. No. 11/083,290, filed Mar. 17, 2005. Title: Engine Control Device. Inventor: Ishida et al.

(Continued)

*Primary Examiner*—Lars A. Olson
*Assistant Examiner*—Daniel V. Venne
(74) *Attorney, Agent, or Firm*—Knobbe, Martens, Olson & Bear, LLP

(57) ABSTRACT

A jet-propelled watercraft can include an engine output control system that adjusts the output of the engine based on a steering force and the engine speed. The control system can also be configured to detect abnormalities in the steering force sensor and to prohibit the increase engine output control when an abnormality is detected.

16 Claims, 13 Drawing Sheets

U.S. PATENT DOCUMENTS

| | | | | |
|---|---|---|---|---|
| 5,113,777 | A | | 5/1992 | Kobayashi |
| 5,118,315 | A | | 6/1992 | Funami et al. |
| 5,144,300 | A | | 9/1992 | Kanno |
| 5,167,546 | A | * | 12/1992 | Whipple ........................ 440/1 |
| 5,167,547 | A | | 12/1992 | Kobayashi et al. |
| 5,169,348 | A | | 12/1992 | Ogiwara et al. |
| 5,184,589 | A | | 2/1993 | Nonaka |
| 5,199,261 | A | | 4/1993 | Baker |
| 5,203,727 | A | | 4/1993 | Fukui |
| 5,244,425 | A | | 9/1993 | Tasaki et al. |
| 5,350,325 | A | | 9/1994 | Nanami |
| 5,352,138 | A | | 10/1994 | Kanno |
| 5,366,394 | A | | 11/1994 | Kanno |
| 5,367,970 | A | | 11/1994 | Beauchamp et al. |
| 5,408,948 | A | | 4/1995 | Arii et al. |
| 5,429,533 | A | | 7/1995 | Kobayashi et al. |
| 5,474,007 | A | | 12/1995 | Kobayashi |
| 5,520,133 | A | | 5/1996 | Wiegert |
| 5,538,449 | A | | 7/1996 | Richard |
| 5,591,057 | A | | 1/1997 | Dai et al. |
| 5,603,644 | A | | 2/1997 | Kobayashi et al. |
| 5,665,025 | A | | 9/1997 | Katoh |
| 5,687,694 | A | | 11/1997 | Kanno |
| 5,697,317 | A | | 12/1997 | Pereira |
| 5,707,264 | A | | 1/1998 | Kobayashi et al. |
| 5,713,297 | A | | 2/1998 | Tani et al. |
| 5,805,054 | A | | 9/1998 | Baxter |
| 5,826,557 | A | | 10/1998 | Motoyama et al. |
| 5,839,700 | A | | 11/1998 | Nedderman, Jr. |
| 5,904,604 | A | | 5/1999 | Suzuki et al. |
| 5,908,006 | A | | 6/1999 | Ibata |
| 5,941,188 | A | | 8/1999 | Takashima |
| 5,988,091 | A | | 11/1999 | Willis |
| 6,032,605 | A | | 3/2000 | Takashima |
| 6,032,653 | A | | 3/2000 | Anamoto |
| 6,038,995 | A | | 3/2000 | Karafiath et al. |
| 6,062,154 | A | | 5/2000 | Ito |
| 6,086,437 | A | | 7/2000 | Murray |
| 6,102,755 | A | | 8/2000 | Hoshiba |
| 6,116,971 | A | | 9/2000 | Morikami |
| 6,135,095 | A | | 10/2000 | Motose et al. |
| 6,138,601 | A | | 10/2000 | Anderson et al. |
| 6,148,777 | A | | 11/2000 | Motose et al. |
| 6,159,059 | A | | 12/2000 | Bernier et al. |
| 6,168,485 | B1 | | 1/2001 | Hall et al. |
| 6,171,159 | B1 | | 1/2001 | Shen et al. |
| 6,174,210 | B1 | | 1/2001 | Spade et al. |
| 6,178,907 | B1 | | 1/2001 | Shirah et al. |
| 6,202,584 | B1 | | 3/2001 | Madachi et al. |
| 6,213,044 | B1 | | 4/2001 | Rodgers et al. |
| 6,216,624 | B1 | | 4/2001 | Page |
| 6,227,919 | B1 | | 5/2001 | Blanchard |
| 6,244,914 | B1 | | 6/2001 | Freitag et al. |
| 6,273,771 | B1 | | 8/2001 | Buckley et al. |
| 6,305,307 | B1 | | 10/2001 | Yokoya |
| 6,314,900 | B1 | | 11/2001 | Samuelsen |
| 6,332,816 | B1 | | 12/2001 | Tsuchiya et al. |
| 6,336,833 | B1 | | 1/2002 | Rheault et al. |
| 6,336,834 | B1 | | 1/2002 | Nedderman, Jr. et al. |
| 6,386,930 | B2 | | 5/2002 | Moffet |
| 6,390,862 | B1 | | 5/2002 | Eichinger |
| 6,405,669 | B2 | | 6/2002 | Rheault et al. |
| 6,415,729 | B1 | | 7/2002 | Nedderman, Jr. et al. |
| 6,428,371 | B1 | * | 8/2002 | Michel et al. ................ 440/38 |
| 6,428,372 | B1 | | 8/2002 | Belt |
| 6,443,785 | B1 | | 9/2002 | Swartz et al. |
| 6,478,638 | B2 | | 11/2002 | Matsuda et al. |
| 6,508,680 | B2 | | 1/2003 | Kanno |
| 6,511,354 | B1 | | 1/2003 | Gonring et al. |
| 6,523,489 | B2 | | 2/2003 | Simzrd et al. |
| 6,530,812 | B2 | | 3/2003 | Koyano et al. |
| 6,551,152 | B2 | | 4/2003 | Matsuda et al. |
| 6,565,397 | B2 | | 5/2003 | Nagafusa |
| 6,568,968 | B2 | | 5/2003 | Matsuda |
| 6,668,796 | B2 | | 12/2003 | Umemoto et al. |
| 6,695,657 | B2 | | 2/2004 | Hattori |
| 6,709,302 | B2 | | 3/2004 | Yanagihara |
| 6,709,303 | B2 | | 3/2004 | Umemoto et al. |
| 6,722,302 | B2 | * | 4/2004 | Matsuda et al. ........ 114/144 R |
| 6,722,932 | B2 | | 4/2004 | Yanagihara |
| 6,732,707 | B2 | | 5/2004 | Kidokoro et al. |
| 6,733,350 | B2 | | 5/2004 | Iida et al. |
| 6,776,676 | B2 | | 8/2004 | Tanaka et al. |
| 6,805,094 | B2 | | 10/2004 | Hashimoto et al. |
| 6,827,031 | B2 | | 12/2004 | Aoyama |
| 6,855,014 | B2 | | 2/2005 | Kinoshita et al. |
| 6,863,580 | B2 | | 3/2005 | Okuyama |
| 6,884,128 | B2 | | 4/2005 | Okuyama et al. |
| 6,886,529 | B2 | | 5/2005 | Suzuki et al. |
| 6,990,953 | B2 | | 1/2006 | Nakahara et al. |
| 6,997,763 | B2 | | 2/2006 | Kaji |
| 7,037,147 | B2 | | 5/2006 | Ito et al. |
| 7,077,713 | B2 | | 7/2006 | Watabe et al. |
| 7,168,995 | B2 | | 1/2007 | Masui et al. |
| 7,175,490 | B2 | | 2/2007 | Kanno et al. |
| 2002/0049013 | A1 | | 4/2002 | Kanno |
| 2003/0000500 | A1 | | 1/2003 | Chatfield |
| 2003/0013354 | A1 | | 1/2003 | Yanagihara |
| 2003/0089166 | A1 | | 5/2003 | Mizuno et al. |
| 2004/0014381 | A1 | * | 1/2004 | Uraki et al. .................. 440/84 |
| 2004/0065300 | A1 | | 4/2004 | Watabe et al. |
| 2004/0067700 | A1 | | 4/2004 | Kinoshita et al. |
| 2004/0069271 | A1 | | 4/2004 | Kanno et al. |
| 2004/0087222 | A1 | * | 5/2004 | Kinoshita et al. .............. 440/1 |
| 2004/0121661 | A1 | | 6/2004 | Okuyama |
| 2004/0147179 | A1 | | 7/2004 | Mizuno et al. |
| 2005/0009419 | A1 | | 1/2005 | Kinoshita |
| 2005/0085141 | A1 | | 4/2005 | Motose |
| 2005/0118895 | A1 | | 6/2005 | Kanno et al. |
| 2005/0263132 | A1 | | 12/2005 | Yanagihara |
| 2005/0273224 | A1 | | 12/2005 | Ito et al. |
| 2005/0287886 | A1 | | 12/2005 | Ito et al. |
| 2006/0004502 | A1 | | 1/2006 | Kaneko et al. |
| 2006/0037522 | A1 | | 2/2006 | Kaneko et al. |

FOREIGN PATENT DOCUMENTS

| | | |
|---|---|---|
| JP | 06-137248 | 5/1994 |
| JP | 07-40476 | 9/1995 |
| JP | 2001-152895 | 6/2001 |
| JP | 2001-329881 | 11/2001 |
| JP | 2002-180861 | 6/2002 |
| JP | 2004-092640 | 3/2004 |
| JP | 2004-137920 | 5/2004 |
| WO | WO 00/40462 | 7/2000 |

OTHER PUBLICATIONS

Co-pending U.S. Appl. No. 11/335,996, filed Jan. 20, 2006. Title: Operation Control System for Small Boat. Inventor: Kinoshita et al.

Co-pending U.S. Appl. No. 11/336,711, filed Jan. 20, 2006. Title: Operation Control System for Planing Boat. Inventor: Kinoshita et al.

Advertisement for trim adjuster for Sea-Doo watercraft—Personal Watercraft Illustrated, Aug. 1998.

Advertisement for trim adjuster—Jet Sports, Aug. 1997.

Advertisement for Fit and Trim and Fit and Trim II—Jet Sports. Aug. 1996.

* cited by examiner

ENGINE OUTPUT CONTROL SYSTEM FOR WATER JET PROPULSION BOAT

PRIORITY INFORMATION

The present application is based on and claims priority under 35 U.S.C. § 119 to Japanese Patent Application Serial No. 2004-191154, filed Jun. 29, 2004, the entire contents of which is hereby expressly incorporated by reference.

BACKGROUND OF THE INVENTIONS

1. Field of the Inventions

The present inventions relate to an engine output control system for a water jet propulsion boats propelled by engine-driven jet propulsion units which eject pressurized and accelerated water from a jet nozzle.

2. Description of the Related Art

With this type of water jet propulsion boat (hereinafter "jet boat"), when an operator releases a throttle lever, the thrust produced by the jet propulsion unit is reduced, and thus steering thrust is reduced. To enhance steering thrust when the throttle has been released, other jet boat designs have been proposed in which, after the throttle lever is released, the return of the throttle to the idling position is slowed, thus slowing the reduction of thrust. This type of system is disclosed in U.S. Pat. No. 6,390,862.

U.S. Pat. No. 6,159,059 discloses another type of jet boat in which the power output from the jet propulsion unit is increased by rotating steering handlebars by a predetermined value or greater in either forward or reverse direction.

U.S. Pat. No. 6,336,833 discloses still another type of jet boat in which the engine power output is elevated only when the throttle lever is pivoted back to the original position and the steering handlebars are operated.

SUMMARY OF THE INVENTIONS

An aspect of at least one of the inventions disclosed herein includes monitoring operational parameters of a steering system of a boat so as to detect and compensate for certain abnormalities, thereby improving the performance of the steering system. For example, in engine output control systems that use steering force or torque for adjusting engine output, a difficulty arises when a steering force sensor fails. Further, when operators are using systems that detect and change engine output based on steering torques, the output of the steering torque sensors vary significantly when the steering torque sensors are operating properly. However, if the output of a steering torque sensor varies less than a predetermined amount, it can be indicative of an abnormality or failure, even though the magnitude of the output of the steering torque sensor is within a normal range.

Thus, in accordance with an embodiment, an engine output control system for a watercraft configured to be propelled by an engine-driven jet propulsion unit configured to which eject water from a nozzle is provided. The control system can comprise a steering force detecting means for detecting a steering force applied by an operator, a decelerating state determining means for determining if the boat is in a predetermined decelerating state, and a decelerating engine output control means for controlling decelerating engine output based on the steering force detected by the steering force detecting means, when the decelerating state determining means determines that the boat is in the predetermined decelerating state. The control system can also include a decelerating engine output control prohibiting means for prohibiting the decelerating engine output control means from decelerating engine output control when the steering force detected by the steering force detecting means falls within a normal range between a maximum threshold and minimum threshold, and variation in steering force detected by the steering force detecting means within a predetermined time period is equal to or lower than a given predetermined value.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

Figure 1:
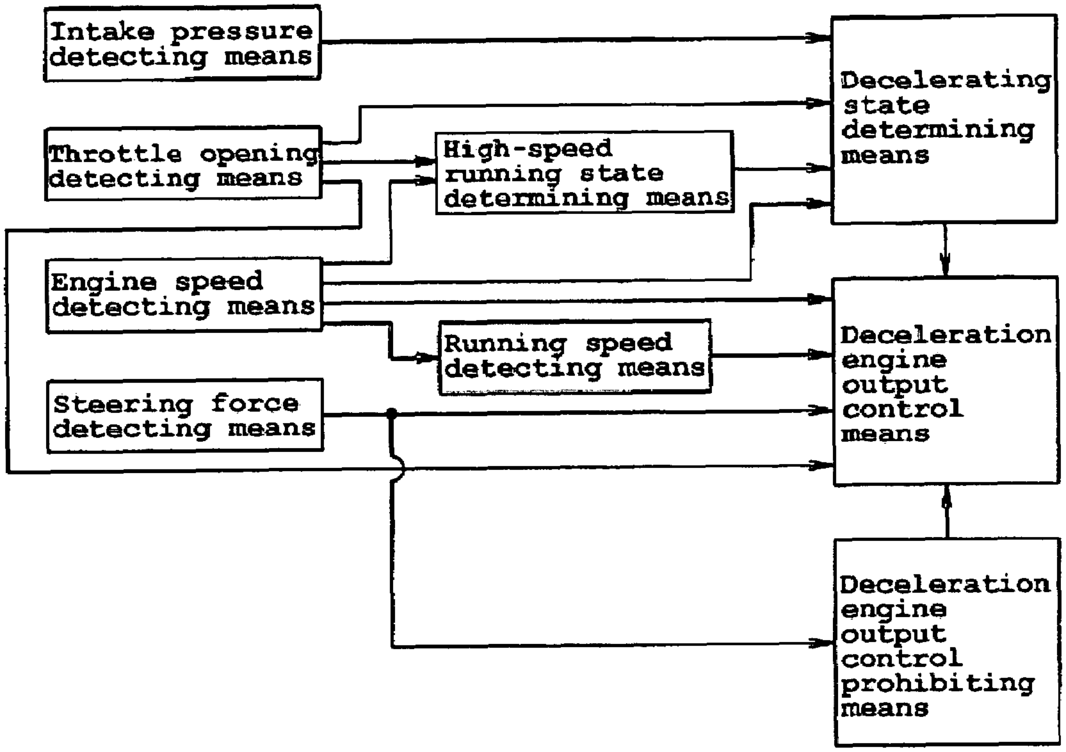
FIG. 1 is a schematic diagram of an engine output control system for a water jet propulsion boat in accordance with an embodiment.
Figure 2:
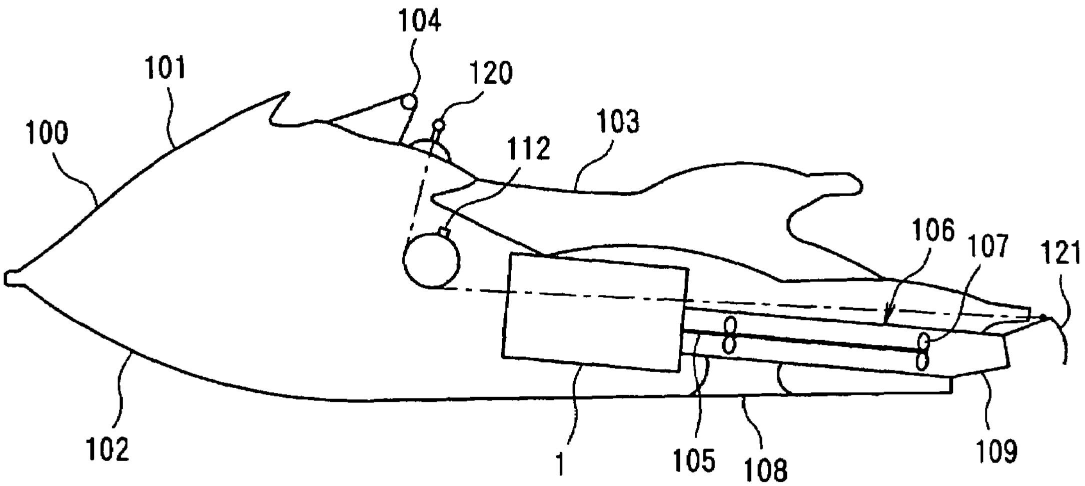
FIG. 2 is a schematic left side elevational view of a jet boat that can incorporate the engine output control system illustrated in FIG. 1.

FIG. 1 is a schematic diagram of an engine output control system that can be used for controlling the power output of an engine of a jet boat. An exemplary jet boat is illustrated in FIG. 2. In this example, the jet boat is a personal watercraft. The embodiments disclosed herein are described in the context of a personal watercraft having a water type propulsion system because the embodiments disclosed herein have particular utility in this context. However, the embodiments and inventions herein can also be applied to other boats having other types of propulsion units as well as other types of vehicles.

The watercraft according to the present embodiment is provided with a four-stroke engine 1. The watercraft can include an intake air pressure detecting module for detecting an intake air pressure in the engine, a throttle opening detecting module for detecting opening of a throttle valve operated by an operator, and an engine speed detecting module for detecting an engine speed. The watercraft can also include a steering force detecting module for detecting a steering force, such as steering torque, applied by the operator, a high-speed running state determining module for determining a high-speed running state based on the throttle opening detected by the throttle opening detecting module and the engine speed detected by the engine speed detecting module, and a running speed detecting module for detecting a running speed based on the engine speed detected by the engine speed detecting module. The watercraft can also include a decelerating state determining module for determining a decelerating state based on the intake air pressure detected by the intake air pressure detecting module, the throttle opening detected by the throttle opening detecting module, the result determined by the high speed running state determining module, and the engine speed detected by the engine speed detecting module. Additionally, the watercraft can also include a decelerating engine output control module for controlling decelerating engine output based on the result determined by the decelerating state determining module, the engine speed detected by the engine speed detecting module, the running speed detected by the running speed detecting module, the steering force detected by the steering force detecting module, and the throttle opening detected by the throttle opening detecting module. A decelerating engine output control prohibiting module can also be included which prohibits the decelerating engine output control based on the steering force detected by the steering force detecting module.

FIG. 2 is a schematic view showing an example of the watercraft using an engine output control system of an embodiment. A body 100 of the watercraft in this embodiment includes a lower hull member 101 and an upper deck member 102. A straddle type seat 103 can be provided on the deck member 102. In front of the seat 103, steering handlebars 104 can also be provided.

The engine 1, as a "driving" or "power" source, can be disposed in the body 100. An output shaft 105 of the engine 1 can be connected to an impeller 107 in a jet propulsion unit 106. The engine 1 drives the impeller 107 of the jet propulsion unit 106, causing it to rotate. This allows water to be drawn from a water intake 108 provided at the bottom of the body. The water pressurized and accelerated in the jet propulsion unit 106 is ejected rearward from a nozzle 109, propelling the boat forward.

Turning the handlebars 104 permits a steering device, referred to herein as a "deflector", in the rear of the nozzle 109 to swing side to side. This changes the direction at which the water is ejected from the unit 106, causing the boat to turn.

The boat can also be moved rearward by operating a reverse lever 120 to pivot a reverse gate 121 disposed at the rear of the nozzle 109, so that the water ejected from the nozzle 109 is thereby re-directed forwardly, thereby generating rearward thrust. Reference numeral 112 denotes a reverse switch for detecting a state of the reverse lever 120.

Figure 3:
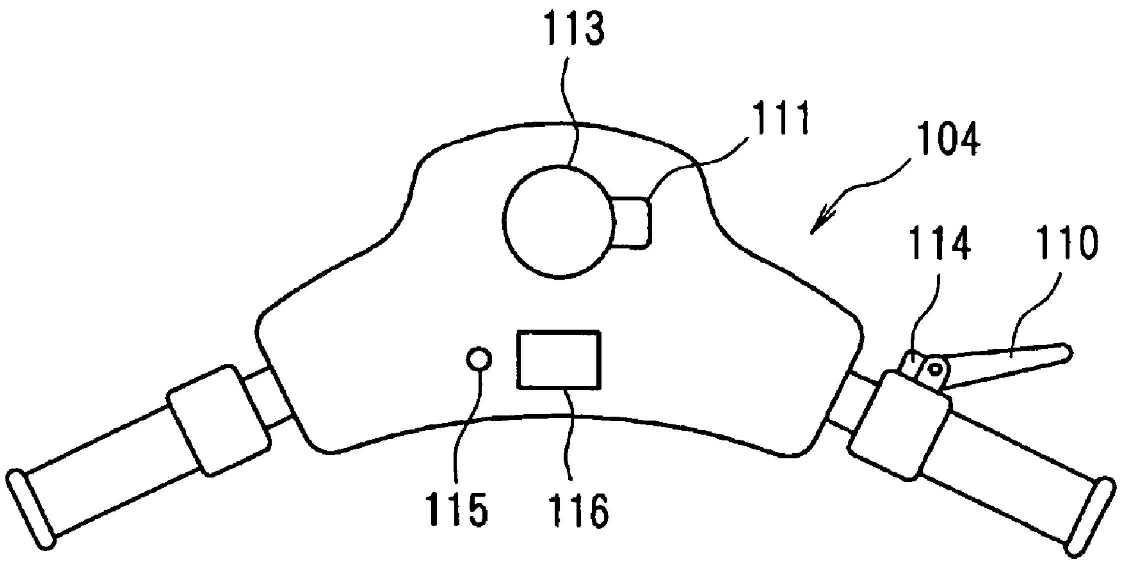
FIG. 3 is a schematic top plan view of handlebars of the jet boat in FIG. 2.

FIG. 3 shows an exemplary but non-limiting structure of the handlebars 104. The handlebars 104 can rotate about a steering shaft 113 and be steered left and right. The handlebars 104 can also have a throttle lever 110, operable in accordance with operator's will, adjacent to its right or left grip.

The throttle lever 110 can be biased so as to pivot away from the grip when released, as shown in FIG. 3. Pivoting the throttle lever 110 toward the grip increases the power output, torque output, and/or speed of the engine, and thus causes acceleration of the boat. In other words, permitting the throttle lever 110 to pivot back to the original position, towards the idle position means that the throttle lever 110 is released.

The steering shaft 113 can be provided with a steering torque sensor 111 for detecting a steering force applied to the handlebars 104, specifically, a steering torque. The steering torque sensor 111 can be a load cell for detecting a steering torque on the handlebars 104 being steered by a predetermined steering angle or greater.

The throttle lever 110 can have a throttle lever position sensor 114 provided at one end thereof. This can be designed to detect displacement of the throttle lever 110 by the operator. In some embodiments, this can also be directly correlated to a position of a throttle valve or a "throttle opening". For example, the throttle lever 100 can be directly connected to and thereby directly control the movement of a throttle valve. In other embodiments, the throttle valve can be controlled by an electronic actuator and be controlled so as to cause the engine 1 to output power, torque, and/or an engine speed generally proportional to the position of the throttle lever, the position of which is detected by the sensor 114. In the center of the handlebars 104 on the side forward of the operator, an LED warning lamp 115 and a speaker 116 can also be provided.

Figure 4:
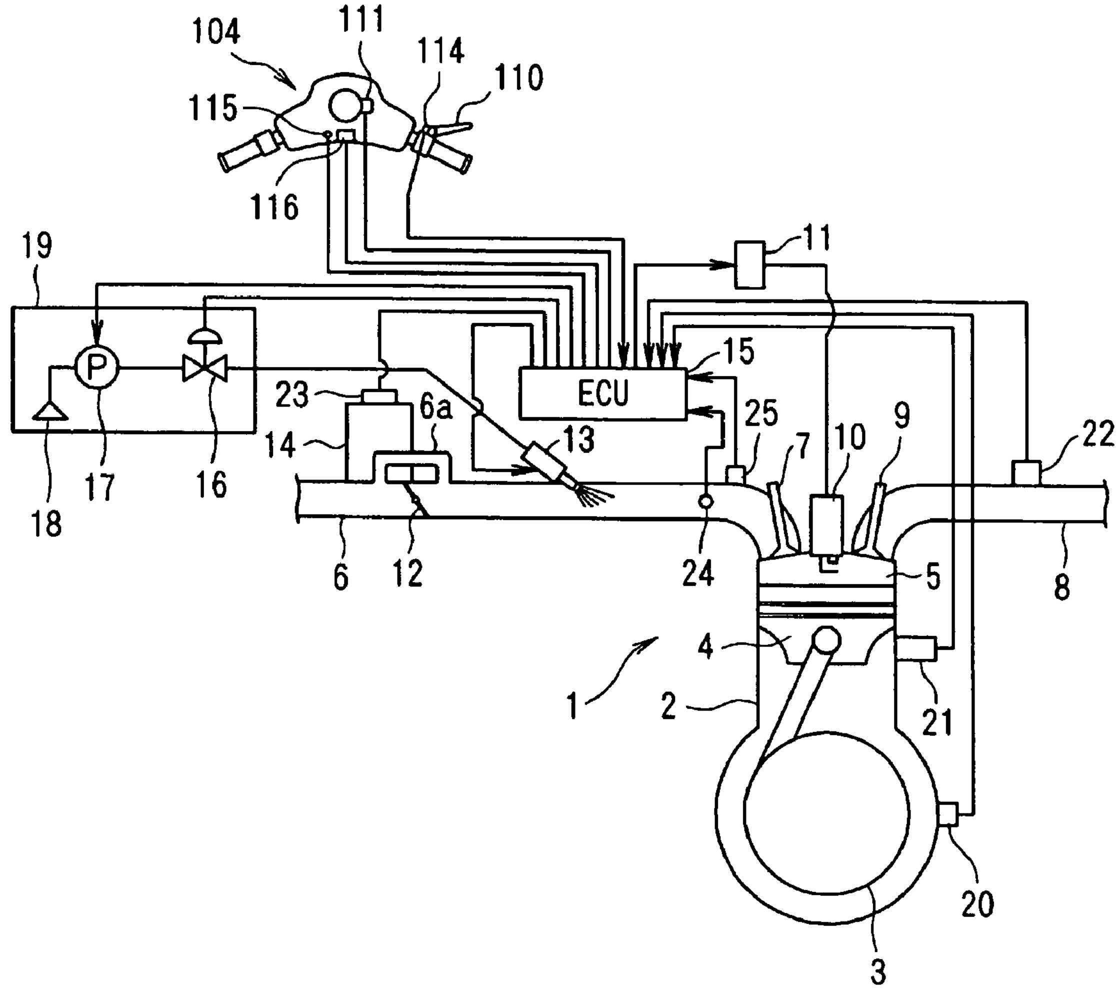
FIG. 4 is a schematic view of an engine and a connected engine output control system according to an embodiment of the jet boat in FIG. 2.

FIG. 4 shows a schematic view of an exemplary engine that can be used with the embodiments disclosed herein. The engine 1 of this embodiment can be a four-stroke, relatively small-displacement engine. The engine 1 can include a cylinder body 2, a crankshaft 3, a piston 4, a combustion chamber 5, an intake pipe 6, an intake valve 7, an exhaust pipe 8, an exhaust valve 9, a spark plug 10 and an ignition coil 11. In the intake pipe 6, a throttle valve 12, which can be opened and closed in accordance with the opening of the throttle lever 110, can be provided and an injector 13 as a fuel injector can be disposed downstream of the throttle valve 12. A filter 18, a fuel pump 17 and a pressure control valve 16 are contained in a fuel tank 19, and connected to the injector 13.

However, this is merely one type of engine that can b us with the embodiments and inventions disclosed herein. The engine 1 can have other numbers of cylinders, can have medium or large displacements, and can have other cylinder orientations (e.g., V-type, horizontally opposed, W-type, etc.) Additionally, the engine 1 can operate in accordance with other principles of combustion (e.g., diesel, two-stroke, rotary, etc.).

In a vicinity of the throttle valve 12 in the intake pipe 6, a bypass 6*a* for allowing air to bypass the throttle valve 12 can be disposed. The bypass 6*a* can be provided with a bypass valve 14 (which can be configured to operate as a decelerating engine output control means) for regulating the opening of the bypass 6*a*. Similar to a typical idle speed control valve, the bypass valve 14 can be designed to regulate the flow rate of some of the intake air flowing toward the engine 1 to control the engine output, particularly engine torque in this case, independent of the opening of the throttle valve 12. The opening of the bypass 6*a* or engine torque can be controllable by controlling a value of current to the actuator 23 for operating the bypass valve 14 or a duty ratio as is the case with an electromagnetic duty valve (valves in which intermediate positions are achieved by applying an electronic power signal in accordance with a duty cycle).

An engine control unit 15 can be provided to control the operations of the engine 1 and the actuator 23 for the bypass valve 14. The engine control unit 15 can include a processing unit such as a microcomputer. A means for inputting signals to the engine control unit 15 for these operations, in other words, a means for detecting the operating conditions of the engine 1, has a crank angle sensor 20 (engine speed detecting means), a cooling water temperature sensor 21, an exhaust air-fuel ratio sensor 22, an intake air pressure sensor 24, and an intake air temperature sensor 25. The crank angle sensor 20 can be configured to detect the rotational angle, namely, phase, of the crankshaft 3, as well as the rotational speed of the crankshaft 3 itself.

The cooling water temperature sensor 21 can be configured to detect the temperature of the cylinder body 2 or cooling water, namely, the temperature of the engine body. The exhaust air-fuel ratio sensor 22 can be configured to detect the air-fuel ratio in the exhaust pipe 8. The intake air pressure sensor 24 can be configured to detect the pressure of intake air in the intake pipe 6. The intake air temperature sensor 25 can be configured to detect the temperature in the intake pipe 6, namely, the temperature of intake air.

The engine torque control also uses signals outputted from the steering torque sensor 111 (steering force detecting means) provided at the steering handlebars 104 and signals outputted from the throttle opening sensor 114 (throttle opening detecting means) provided at the end of the throttle lever 110. The engine control unit 15 can be configured to receive the signals detected by these sensors and outputs the control signals to the fuel pump 17, the pressure control valve 16, the injector 13, the ignition coil 11 and the actuator 23, as well as the warning driving signals to the warning lamp 115 and the speaker 116.

Figure 5:
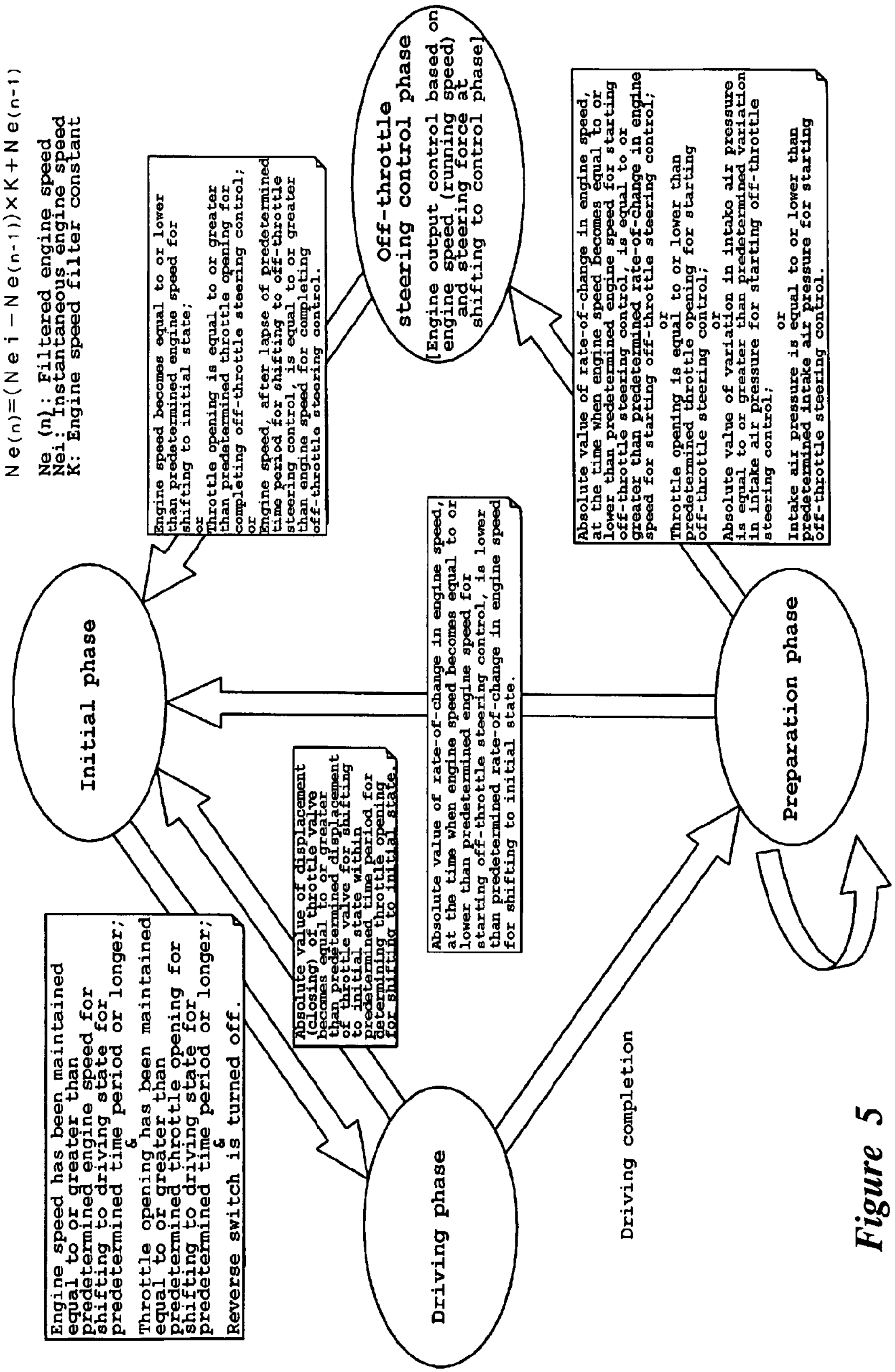
FIG. 5 is a schematic block diagram illustrating the logic of decelerating engine output control that can be conducted by the engine output control system of FIG. 4.

The engine control unit 15 can be configured to execute various processing operations to control the operations of the engine 1, including bypass opening control of the bypass 6*a* performed by the bypass valve 14. FIG. 5 shows an outline of the logic of the bypass opening control. For purposes of explanation only, the bypass opening control is described as including involves four control phases, however, more or fewer phases can be used. For example, but without limitation, the bypass opening control logic could also consist of three phases because a driving state (driving phase) and a preparation state (preparation phase) are both in the process of reaching a high-speed running state, which would be substantially equivalent eventually, as will be discussed later. Other variations can also be applied.

As noted above, the logic of the bypass opening control can include four phases, including an initial state (initial phase) under which the engine is rotating while the boat is not ready to go, a driving state (driving phase) under which the bypass valve is operated to a predetermined position, a preparation state (preparation phase) under which the boat is running at a predetermined high speed while being in standby mode until the decelerating state is detected, and an off-throttle steering control state (off-throttle steering control phase) under which the boat is in a predetermined decelerating state while controlling the engine output, more specifically engine torque, for thrust control.

Figure 6:
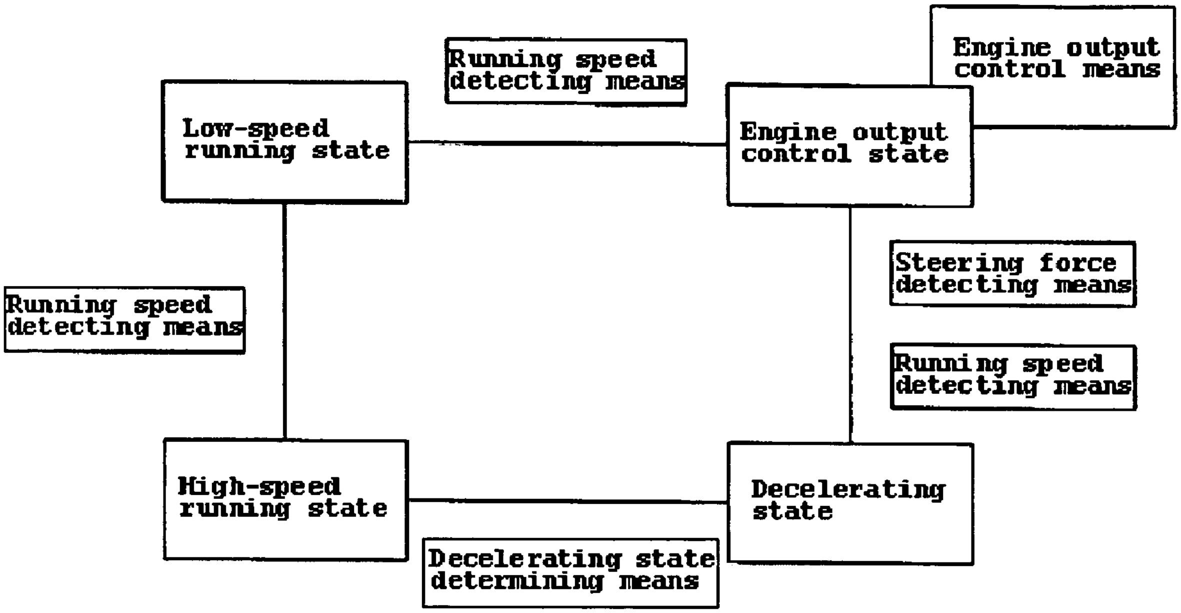
FIG. 6 is a schematic block diagram further illustrating the logic represented in FIG. 5.
Figure 7:
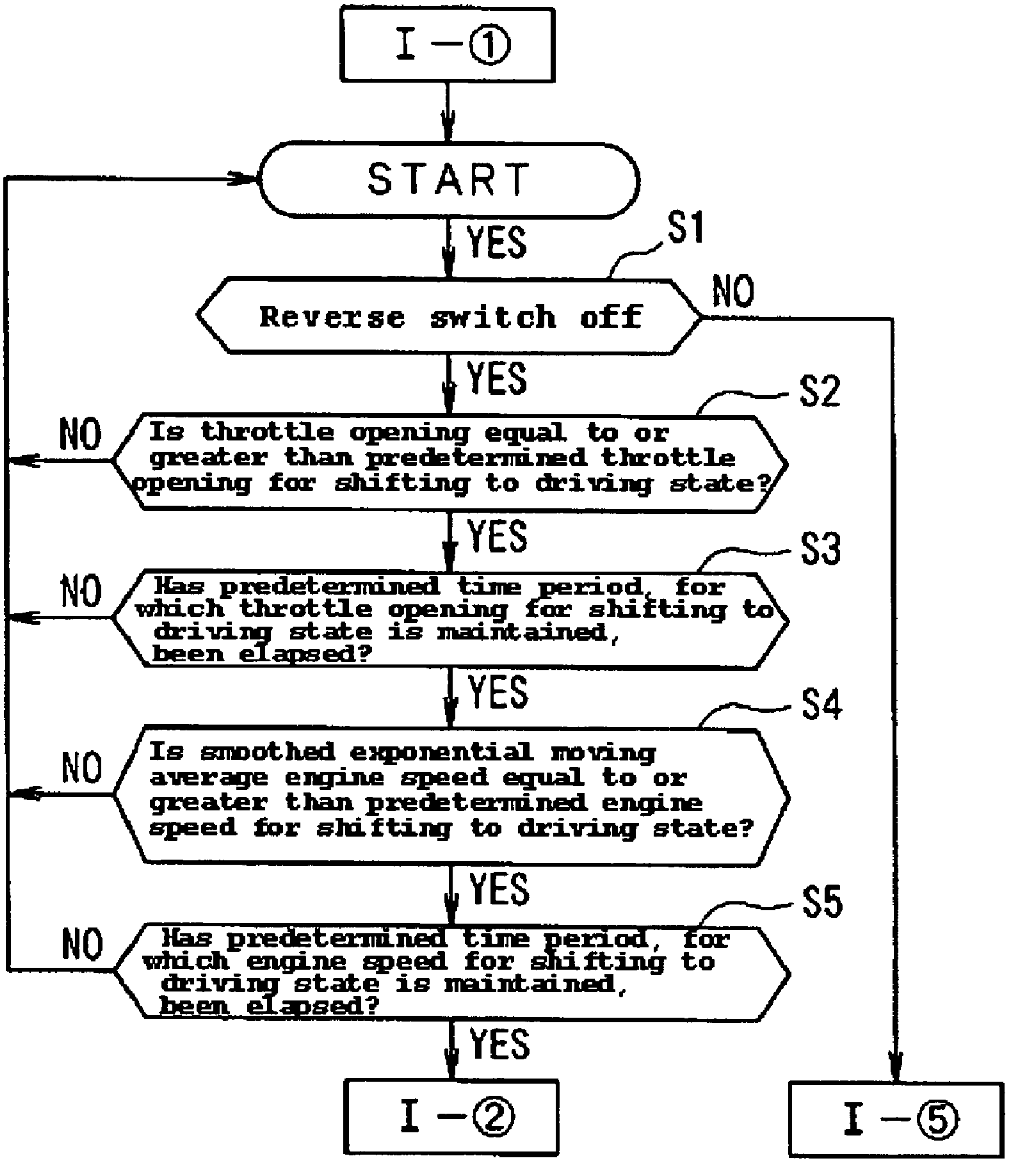
FIG. 7 is a flow chart showing an exemplary process that can be used to perform the control logic of FIG. 5.
Figure 8:
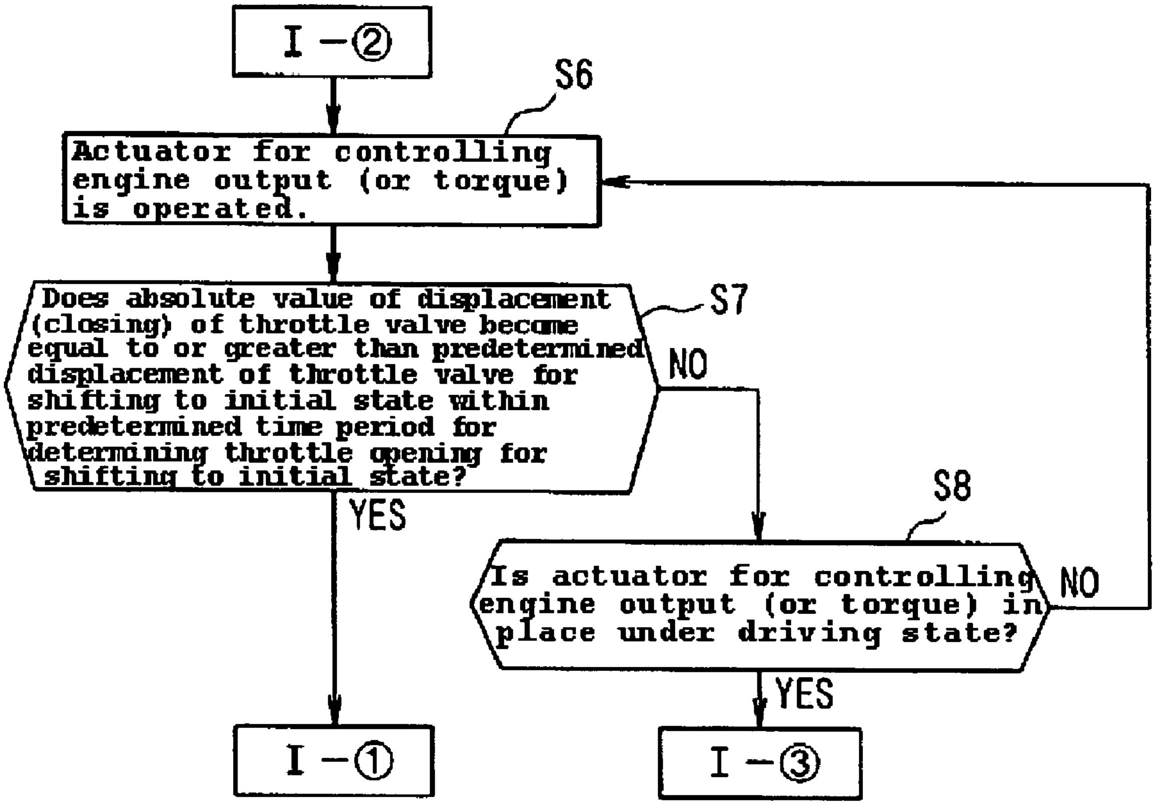
FIG. 8 is another flow chart showing an exemplary operation process that can be used to perform the control logic of FIG. 5.
Figure 9:
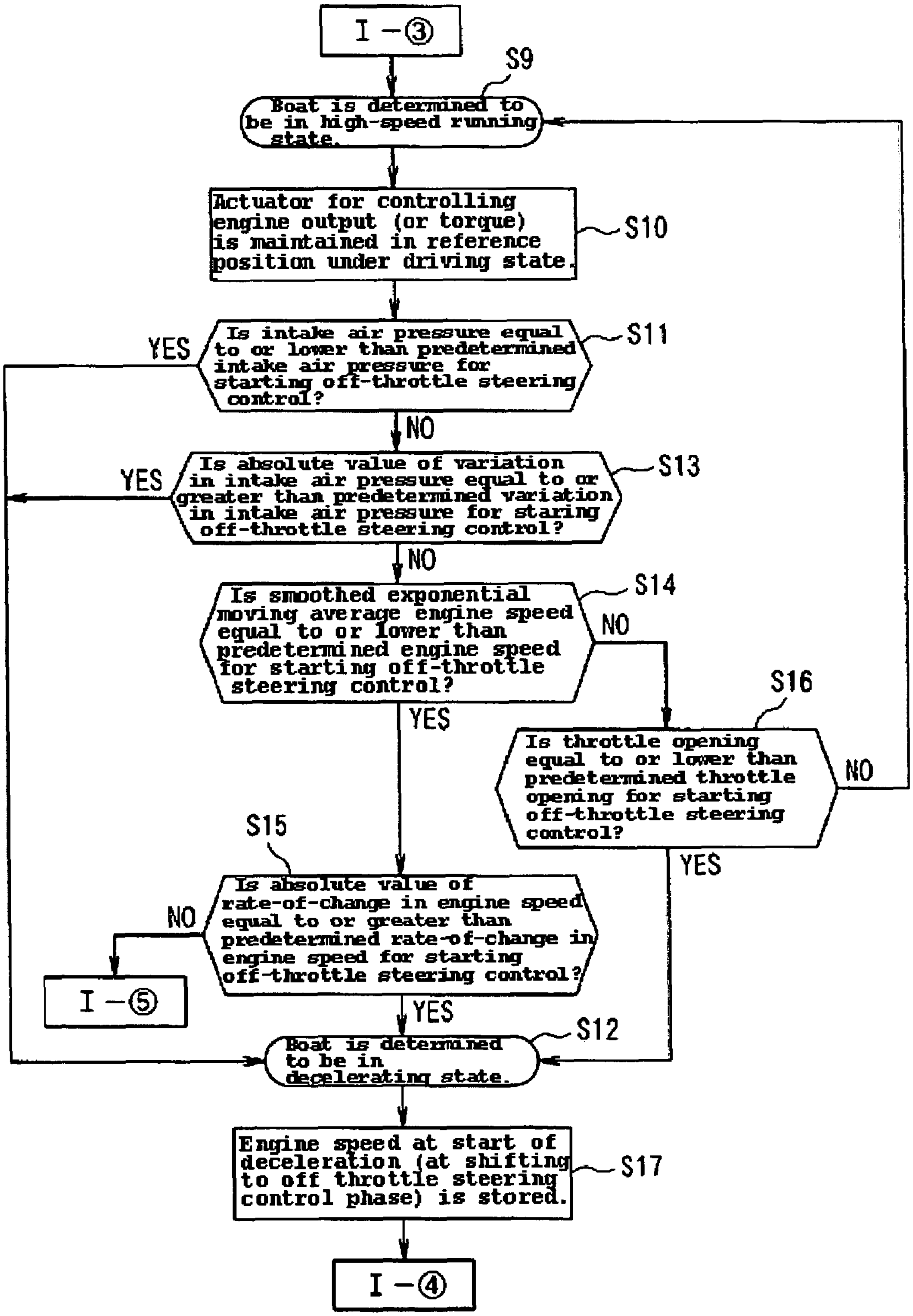
FIG. 9 is a flow chart showing an exemplary operation process that can be used to perform the control logic of FIG. 5.
Figure 10:
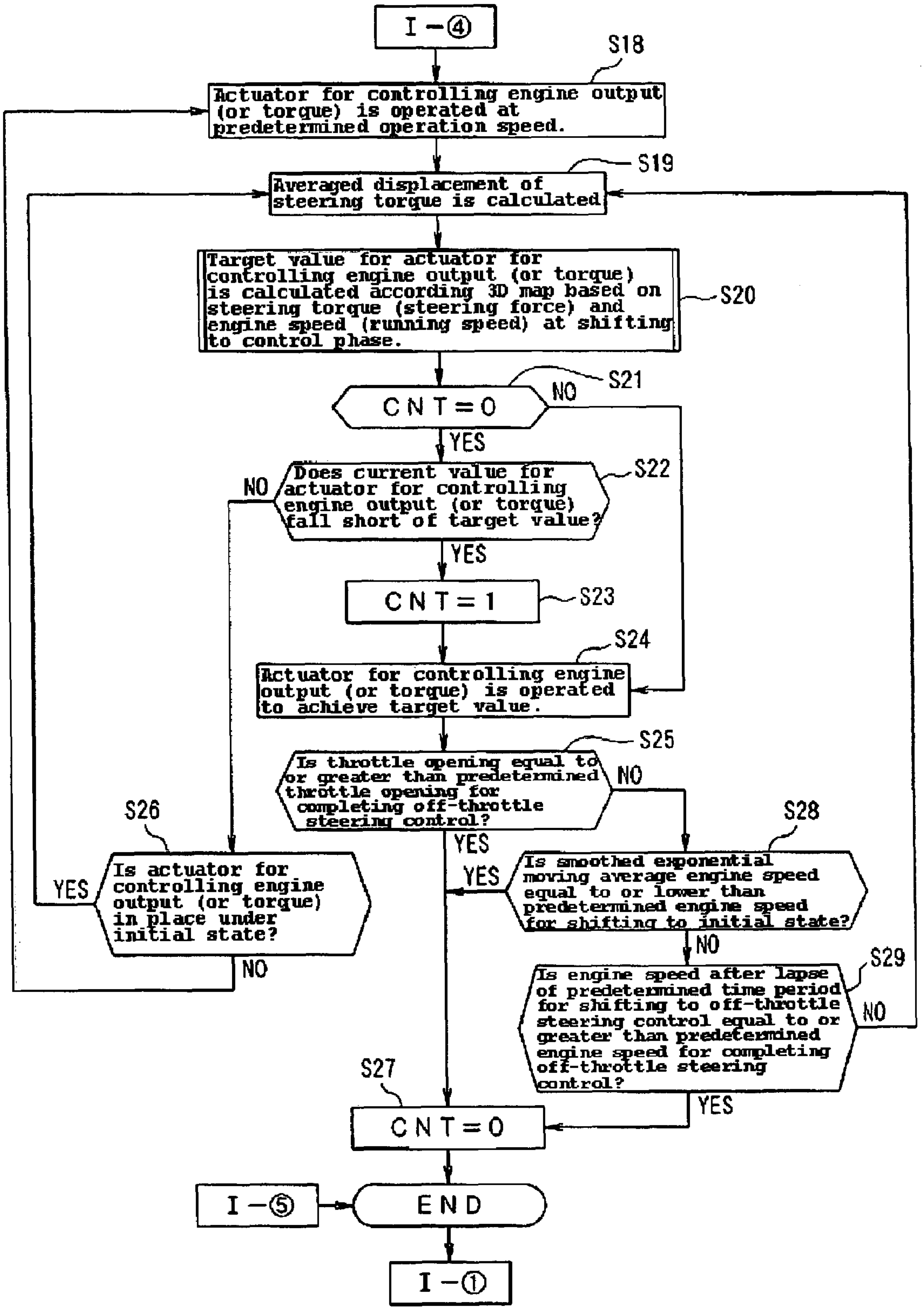
FIG. 10 is a flow chart showing an exemplary operation process that can be used to perform the control logic of FIG. 5.

The bypass 6*a* can be fully closed under the initial state and then it is being opened or operated to the extent that a dashpot is in standby mode under the driving state. Under the preparation state, the opening of the bypass 6*a* can be maintained to the extent that the dashpot is in standby mode. Then, under the off-throttle steering control state, the bypass opening can be controlled to control the engine output, particularly engine torque in this case, based on boat's running speed, more specifically engine speed, as well as on steering force of the steering handlebars 104, more specifically steering torque, according to a control map to be discussed later. FIG. 6 shows a schematic diagram for the control logic of FIG. 5 corresponding to the present invention.

There are difficulties in accurately detecting the speed of a watercraft. In addition, watercraft generally do not have transmissions. A boat's running speed can therefore be estimated by the engine speed by compensating for a certain amount of delay or lag between a change in engine speed and a change in watercraft speed. In the present embodiment, a so-called "smoothed exponential moving average" engine speed Ne(n) can be expressed by the following equation 1 can be used as the boat's running speed in the control logic (running speed detecting means). This makes it possible to detect boat's running speed quite accurately.

$$Ne(n)=(Nei-Ne(n-1))\times K+Ne(n-1) \quad \text{[Equation 1]}$$

Ne(n): Filtered engine speed (smoothed exponential moving average engine speed=running speed)

Nei: Instantaneous engine speed

K: Engine speed filter constant

However, other equations can also be used.

It is assumed that conditions for shifting from the initial state to the driving state include the following: (1) the reverse lever is not being operated, that is, the reverse switch is turned off, in other words, the boat is ready to go forward, (2) the smoothed exponential moving average engine speed or running speed has been maintained equal to or greater than a predetermined engine speed for shifting to the driving state for a predetermined time period or longer, (3) and the throttle opening has been maintained equal to or greater than a predetermined throttle opening for shifting to the driving state for a predetermined time period or longer.

In other words, the boat can be shifted from the initial state to the driving state if the throttle opening reaches equal to or greater than a certain degree and the running speed is maintained equal to or greater than a certain speed for a certain time period. On the other hand, in some embodiments, it can be assumed that a condition for shifting from the driving state to the initial state is that an absolute value of displacement to the closing state of the throttle valve becomes equal to or greater than predetermined displacement of the throttle valve for shifting to the initial state within a predetermined time period for determining the throttle opening for shifting to the initial state.

Similarly, in some embodiments, it can be assumed that conditions for shifting from the initial state to the driving state include the following: (1) the reverse lever is not being operated, that is, the reverse switch is turned off, in other words, the boat is ready to go forward, (2) the smoothed exponential moving average engine speed or running speed has been maintained equal to or greater than a predetermined engine speed for shifting to the driving state for a predetermined time period or longer, and (3) the throttle opening has been maintained equal to or greater than a predetermined throttle opening for shifting to the driving state for a predetermined time period or longer. In other words, the boat can be shifted from the initial state to the driving state if the throttle opening reaches equal to or greater than a certain degree and the running speed can be maintained equal to or greater than a certain speed for a certain time period. On the other hand, in some embodiments, it can be assumed that a condition for shifting from the driving state to the initial state is that an absolute value of displacement (closing) of the throttle valve becomes equal to or greater than predetermined displacement of the throttle valve for shifting to the initial state within a predetermined time period for determining the throttle opening for shifting to the initial state. Thus, if the throttle valve is sufficiently closed in the course of shifting to the driving state, the boat can be shifted back to the initial state.

The boat, which meets the aforementioned conditions, that is, the throttle opening reaches equal to or greater than a certain degree, and the boat maintains running at equal to or greater than a certain speed for a certain time period or greater, is inevitably led to the high-speed running state and, at this point in time, automatically shifts from the driving state to the preparation state. In addition, the boat can shift from the preparation state directly to the initial state, whose condition is that an absolute value of rate-of-change in engine speed, at the time when the smoothed exponential moving average engine speed or running speed becomes equal to or lower than a predetermined engine speed for starting the off-throttle steering control, is lower than a predetermined rate-of-change in engine speed for shifting to the initial state (a predetermined rate-of-change in engine speed for starting the off-throttle control). In other words, in the case that an absolute value of rate-of-change in running speed, at the time when the high running speed decreases to a predetermined value or lower, is lower than a predetermined value, that is, the boat is slowly decelerating, the boat can shift from the preparation state to the initial state.

It can be assumed that a condition for shifting from the preparation state to the off-throttle steering control state is either that an absolute value of rate-of-change in engine speed, at the time when the smoothed exponential moving average engine speed or running speed becomes equal to or lower than a predetermined engine speed for starting the off-throttle steering control, is equal to or greater than a predetermined rate-of-change in engine speed for starting the off-throttle steering control, or that the throttle opening is equal to or lower than a predetermined throttle opening for starting the off-throttle steering control, or that an absolute value of variation in intake air pressure is equal to or greater than predetermined variation in intake air pressure for starting the off-throttle steering control, or that the intake air pressure is equal to or lower than a predetermined intake air pressure for starting the off-throttle steering control. In other words, in the case that an absolute value of rate-of-change in running speed, at the time when the high running speed decreases to a predetermined value or lower, is equal to or greater than a predetermined value, that is, the boat is quickly decelerating, or that the throttle valve is closed, or that the intake air pressure significantly changes, or that the intake air pressure turns negative, the boat can shift from the preparation state to the off-throttle steering control state.

The boat can shift from the off-throttle steering control state to the initial state, whose condition can be either that the smoothed exponential moving average engine speed or running speed becomes equal to or lower than a predetermined engine speed for shifting to the initial state, or that the throttle opening is equal to or greater than a predetermined throttle opening for completing the off-throttle steering control, or that the engine speed, after a lapse of a predetermined time period for shifting to the off-throttle steering control, is equal to or greater than the engine speed for completing the off-throttle steering control. In other words, the boat shifts from the off-throttle steering control state to the initial state if the boat runs at almost zero speed or the throttle valve can be reopened. Additionally, it is assumed the case, that the engine speed, after a lapse of the predetermined time period for shifting to the off-throttle steering control, is equal to or greater than the engine speed for completing the off-throttle steering control, indicates that such engine speed increases with a lower engine load due to the landing of the boat with its throttle valve closed. Also in this case, the off-throttle steering control is completed.

An operation process that can be performed by the engine control unit 15 in order to achieve the logic of the bypass opening control, is next described with reference to flowcharts shown in FIGS. 7 to 10. In the operation process, a determination is made whether or not the reverse switch 112 is turned off in the step S1, and if the determination is YES, that is, the reverse switch 112 is turned off, the process proceeds to the step S2 or if NO, it can proceed to end (FIG. 10), and repeats.

In the step S2, a determination can be made whether or not the throttle opening detected by the throttle opening sensor 114 is equal to or greater than the predetermined throttle opening for shifting to the driving state. If the determination is YES, that is, the throttle opening thus obtained is equal to or greater than the predetermined throttle opening for shifting to the driving state, the process proceeds to the step S3, or if NO, it proceeds to the step S1 and repeats.

In the step S3, a determination can be made whether or not the predetermined time period, for which the throttle opening for shifting to the driving state is maintained, has been elapsed since the throttle opening is determined to be equal to or greater than the predetermined throttle opening for shifting to the driving state. If the determination is YES, that is, such predetermined time period, for which the throttle opening for shifting to the driving state is maintained, has been elapsed, the process proceeds to the step S4, or if NO, it proceeds to the step S1 and repeats.

In the step S4, a determination can be made whether or not the smoothed exponential moving average engine speed or running speed is equal to or greater than the predetermined engine speed for shifting to the driving state. If the determination is YES, that is, the smoothed exponential moving average engine speed is equal to or greater than the predetermined engine speed for shifting to the driving state, the process proceeds to the step S5, or if NO, it proceeds to the step S1 and repeats.

In the step S5, a determination can be made whether or not the predetermined time period, for which the engine speed for shifting to the driving state is maintained, has been elapsed since the smoothed exponential moving average engine speed was determined to be equal to or greater than the predetermined engine speed for shifting to the driving state. If the determination is YES, that is, such predetermined time period, for which the engine speed for shifting to the driving state is maintained, has been elapsed, the process proceeds to the step S6, or if NO, it proceeds to the step S1 and repeats.

In the step S6, the bypass valve 14 as an actuator for controlling the engine output, more accurately engine torque, is opened or operated to the extent that the dashpot is in standby mode, and then the process proceeds to the step S7. As will be described later, the dashpot standby mode indicates a condition that the dashpot is ready to damp the decrease in engine speed due to closing the throttle.

In the step S7, a determination can be made whether or not an absolute value of displacement (closing) of the throttle valve, detected by the throttle opening sensor 114, becomes equal to or greater than the predetermined displacement of throttle valve for shifting to the initial state within the predetermined time period for determining the throttle opening for shifting to the initial state. If the determination is YES, that is, the absolute value of displacement of the throttle valve becomes equal to or greater than the predetermined displacement of throttle valve for shifting to the initial state within the predetermined time period for determining the throttle opening for shifting to the initial state, the process proceeds to the step S1, or if NO, it proceeds to the step S8.

In the step S8, a determination can be made whether or not the bypass valve 14 as an actuator for controlling the engine output, more accurately engine torque, is in place under the driving state, that is, the dashpot is in standby mode for the bypass valve. If the determination is YES, that is, the dashpot is in standby mode for the bypass valve 14, the process proceeds to the step S9, or if NO, it proceeds to the step S6 and repeats.

In the step S9, the boat can be determined to be in the high-speed running state, and then the process proceeds to the step S10.

In the step S10, the bypass valve 14, as an actuator for controlling the engine output, more accurately engine torque, is maintained in a reference position under the driving state, that is, in the condition that the dashpot is in standby mode for the bypass valve. Then, the process proceeds to the step S11.

In the step S11, a determination can be made whether or not the intake air pressure detected by the intake air pressure sensor 24 is equal to or lower than the predetermined intake air pressure for starting the off-throttle steering control. If the determination is YES, that is, the intake air pressure thus obtained is equal to or lower than the predetermined intake air pressure for starting the off-throttle steering control, the process proceeds to the step S12, or if NO, it proceeds to the step S13. As described above, this determination, whether or not the intake air pressure is a negative pressure, is designed to detect that the boat is in relatively rapid deceleration. This determination can be made, not based on a relative pressure to the atmospheric pressure, but based on an absolute pressure.

In the step S13, a determination can be made whether or not an absolute value of variation in intake air pressure detected by the intake air pressure sensor 24, relative to the intake air pressure before the predetermined time period starts, is equal to or greater than the predetermined variation in intake air pressure for staring the off-throttle steering control. If the determination is YES, that is, the absolute value of variation in intake air pressure is equal to or greater than the predetermined variation in intake air pressure for starting the off-throttle steering control, the process proceeds to the step S12, or if NO, it proceeds to the step S14. As described above, this determination, whether or not the intake air pressure quickly turns negative, is designed to detect that the boat is in relatively rapid deceleration.

In the step S14, a determination can be made whether or not the smoothed exponential moving average engine speed or running speed is equal to or lower than the predetermined engine speed for starting the off-throttle steering control. If the determination is YES, that is, the smoothed exponential moving average engine speed is equal to or lower than the predetermined engine speed for starting the off-throttle steering control, the process proceeds to the step S15, or if NO, it proceeds to the step S16.

In the step S15, a determination can be made whether or not the absolute value of rate-of-change in engine speed, relative to the engine speed before the predetermined time period starts, is equal to or greater than the predetermined rate-of-change in engine speed for starting the off-throttle steering control. If the determination is YES, that is, the absolute value of rate-of-change in engine speed thus obtained is equal to or greater than the predetermined rate-of-change in engine speed for starting the off-throttle steering control, the process proceeds to the step S12, or if NO, it proceeds back to the main program. It can be assumed that in the step S14, the smoothed exponential moving average engine speed is determined to be equal to or lower than the predetermined engine speed for starting the off-throttle steering control, and in the step S15, the absolute value of rate-of-change in engine speed is determined not to be equal to or greater than the predetermined rate-of-change in engine speed for starting the off-throttle steering control, but determined to be lower than that. This meets the condition for shifting from the preparation state to the initial state, which can lead the boat to the initial state.

In the step S16, a determination can be made whether or not the throttle opening detected by the throttle opening sensor 114 is equal to or lower than a predetermined throttle opening for starting the off-throttle steering control. If the determination is YES, that is, the throttle opening thus obtained is equal to or lower than the predetermined throttle opening for starting the off-throttle steering control, the process proceeds to the step S12, or if NO, the process proceeds to the step S9.

In the step S12, the boat can be determined to be in the predetermined decelerating state, and then the process proceeds to the step S17.

In the step S17, the engine speed at the start of deceleration, that is, at shifting to the off-throttle steering control phase, can be renewed and stored, and then the process proceeds to the step S18.

In the step S18, the bypass valve 14 as an actuator for controlling the engine output, e.g., engine torque, can be operated at a given predetermined operation speed, and then the process proceeds to the step S19. As described above, under the condition where the boat is decelerating from high speed at a relatively high rate, as the thrust sharply decreases with the engine speed, additional thrust can be desirable for enhancing steering. Thus, the predetermined actuator operation speed can be designed to control the operation speed of the bypass valve 14 so as to dampen the decrease in engine speed, that is, so as to slowly close the bypass 6*a*, to gradually decrease the engine speed. Thus, the actuator operation speed can be kept constant in the embodiment of the present invention, but it can be varied depending on boat's running state. For example, the variable actuator operation speed can be preset depending on the variation in the throttle opening relative to the one before the predetermined time period or running speed, that is, the smoothed exponential moving average engine speed.

In the step S19, an averaged displacement of the steering torque (steering force) detected by the steering torque sensor 111 can be calculated, and then the process proceeds to the step S20.

In the step S20, based on the steering torque (steering force) calculated in the step S19 as well as on the smoothed exponential moving average engine speed (running speed) at shifting to the control phase, which is renewed and stored in the step S17, a target value for the actuator for controlling the engine output (e.g., engine torque) can be determined. For example, a target value for the bypass opening can be determined according to a control map, an exemplary map being shown in FIG. 11. Then, the process proceeds to the step S21.

The control map can be designed such that a target value of the bypass opening or engine torque, and therefore the thrust of the boat, increases when the smoothed exponential moving average engine speed or running speed at the control phase, that is, at the moment of shifting to the decelerating state, is equal to or greater than the predetermined value. The control map can be also designed such that as the steering torque (steering force) increases, a target value of the bypass opening or engine torque, and therefore the thrust of the boat, increases. This can provide steerability corresponding to the steering torque (steering force) while preventing driving discomfort, such as undesirable reacceleration after sufficient deceleration can be provided.

In the step S21, a determination can be made whether or not a control counter CNT is reset to "0". If the determination is YES, that is, the control counter CNT can be reset to "0", the process proceeds to the step S22, or if NO, it proceeds to the step S24.

In the step S22, a determination can be made whether or not a current value for the bypass valve 14 as an actuator for controlling the engine output, e.g., engine torque, falls short of the target value preset in the step S20. If the determination is YES, that is, the current value for the bypass valve 14 falls short of the target value, the process proceeds to the step S23, or if NO, it proceeds to the step S26.

The control counter CNT can be set to "1" in the step S23, and then the process proceeds to the step S24.

In the step S24, the bypass valve 14 as an actuator for controlling the engine output, e.g., engine torque, can be operated to achieve the target value, and then the process proceeds to the step S25.

In the step S25, a determination can be made whether or not the throttle opening detected by the throttle opening sensor 114 is equal to or greater than a predetermined throttle opening for completing the off-throttle steering control. If the determination is YES, that is, the throttle opening thus obtained is equal to or greater than the predetermined throttle opening for completing the off-throttle steering control, the process proceeds to the step S27, or if NO, the process proceeds to the step S28.

In the step S28, a determination can be made whether or not the smoothed exponential moving average engine speed or running speed is equal to or lower than the predetermined engine speed for shifting to the initial state. If the determination is YES, that is, the smoothed exponential moving average engine speed is equal to or lower than the predetermined engine speed for shifting to the initial state, the process proceeds to the step S27, or if NO, it proceeds to the step S29.

In the step S29, a determination can be made whether or not the engine speed after a lapse of the predetermined time period for shifting to the off-throttle steering control is equal to or greater than the predetermined engine speed for completing the off-throttle steering control. If the determination is YES, that is, such engine speed after a lapse of the predetermined time period for shifting to the off-throttle steering control is equal to or greater than the predetermined engine speed for completing the off-throttle steering control, the precess proceeds to the step S27, or if NO, it proceeds to the step S19.

The control counter CNT can be reset to "0" in the step S27, and then the process proceeds back to the main program.

In the process S26, a determination can be made whether or not the bypass valve 14 as an actuator for controlling the engine output, e.g., engine torque, is in place under the initial state that is, the bypass is fully closed. If the determination is YES, that is, the bypass is fully closed for the bypass valve 14, the process proceeds to the step S19, or if NO, it proceeds to the step S18.

According to the above process, under a predetermined decelerating state where the boat is decelerating from high speed at a relatively high rate, the engine output, e.g., engine torque, and therefore the thrust of the boat, are controlled based on the steering torque or steering force, and the smoothed exponential moving average engine speed or running speed. This provides both additionally thrust for steering and running speed corresponding to the steering force, thereby providing a more comfortable steering feeling.

As the steering force increases, the engine output, e.g., engine torque, and therefore the thrust of the boat increase in order to provide additional thrust, and thus enhanced steerability, generally proportional to the steering force. In addition, if the running speed is equal to or greater than a predetermined value, the engine output, e.g., engine torque, and therefore the thrust of the boat increases. This can prevent driving discomfort, such as undesirable reacceleration after sufficient deceleration has been provided.

Also, if the throttle opening is equal to or lower than the predetermined throttle opening for starting the off-throttle steering control, it is determined that the boat is under the predetermined decelerating state. This enhances the control of the engine output, e.g., engine torque, and therefore the thrust of the boat, at the time of deceleration when the throttle lever can be pivoted back to the original position.

Further, the boat's running speed can be detected by smoothing the values of engine speed, in other words, by performing the moving average calculation. Therefore, the running speed suitable for the control of the engine output, e.g., engine torque, and therefore the thrust of the boat can be provided for the watercraft, thereby avoiding the difficulties associated with detecting accurate running speeds.

Further, if the absolute value of rate-of-change in engine speed, at the time when the smoothed exponential moving average engine speed or running speed becomes equal to or lower than the predetermined engine speed for starting the off-throttle steering control, is equal to or greater than the predetermined rate-of-change in engine speed for starting the off-throttle steering control, the boat is determined to be under the predetermined decelerating state. This allows a condition, where a rate-of-change in smoothed exponential moving average engine speed or a rate-of-deceleration (amount of decrease) in running speed is high, to be detected as a proper deceleration.

If the absolute value of variation in intake air pressure is equal to or greater than the predetermined value, or the intake air pressure is equal to or lower than the predetermined value, the boat is determined to be under the predetermined decelerating state. This allows a condition, where rate-of-decrease (amount of decrease) in engine speed or running speed is high, to be detected as a proper deceleration, particularly for the four-stroke engine of this embodiment.

If the smoothed exponential moving average engine speed or running speed becomes equal to or lower than the predetermined engine speed for shifting to the initial state, the decelerating control of the engine output, e.g., engine torque, and therefore the thrust of the boat is completed. This better prevents driving discomfort, such as undesirable reacceleration after sufficient deceleration is provided, as well as provides enhanced decelerating thrust control.

When the throttle opening becomes equal to or greater than the predetermined throttle opening for completing the off-throttle steering control, the decelerating control of the engine output, e.g., engine torque, and therefore the thrust of the boat is completed. This allows the boat to complete the decelerating thrust control as well as to quickly reaccelerate.

If the engine speed, after a lapse of the predetermined time period for shifting to the off-throttle steering control from the decelerating state, is equal to or greater than the engine speed for completing the off-throttle steering control, the decelerating control of the engine output, e.g., engine torque, and therefore the thrust of the boat, is completed. This allows the decelerating thrust control to terminate when the case that the engine speed increases due to the landing of the boat.

After the boat was detected to be under the predetermined high-speed running state, the boat is determined to have shifted to the predetermined decelerating state. This allows the decelerating thrust output control to terminate when the throttle lever is pivoted back to the original position from the high-speed running position.

If the smoothed value of the engine speed or running speed has been maintained equal to or greater than the predetermined engine speed for shifting to the driving state for a predetermined time period or longer, and the throttle opening has been maintained equal to or greater than the predetermined throttle opening for shifting to the driving state for a predetermined time period or longer, the boat can be determined to be under the predetermined high-speed running state. This allows for enhanced detection of a high speed running state of the boat.

If the absolute value of the rate-of-change in engine speed, at the time when the smoothed exponential moving average engine speed, that is, running speed, becomes equal to or lower than the predetermined engine speed for starting the off-throttle steering control, becomes lower than the predetermined rate-of-change in engine speed for shifting to the initial state, the boat is determined to have completed the high speed running state with no transition to the relatively rapid decelerating state. This enhances the prevention of unnecessary decelerating engine output control.

If the absolute value of displacement to the closing state of the throttle valve becomes equal to or greater than the predetermined displacement of the throttle valve for shifting to the initial state within the predetermined time period for determining the throttle opening for shifting to the initial state, the boat is determined not to have reached the high-speed running state. Therefore, this enhances the prevention of unnecessary decelerating engine output control.

The decelerating engine output, e.g., engine torque, and therefore the thrust of the boat are designed to be controlled by regulating the opening of the bypass combined with the throttle valve. This further facilitates the practical use of the decelerating engine output control.

Figure 12:
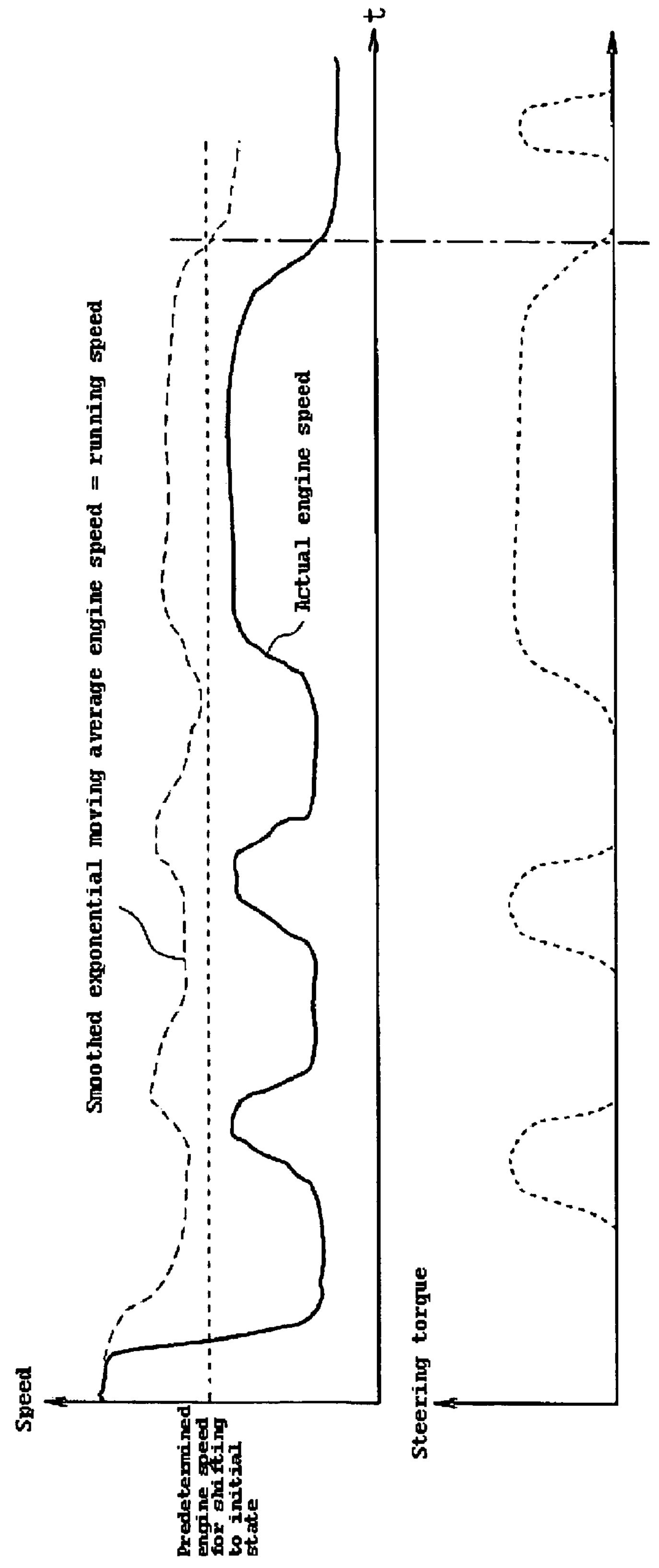
FIG. 12 is a timing diagram illustrating an exemplary operation of a decelerating engine output control process.

FIG. 12 is a graph showing exemplary changes in engine speed that can be generated during normal operation of a watercraft. This graph also shows changes in steering torque and the operation of the logic of the off-throttle steering control shown in FIGS. 7 to 10.

Figure 11:
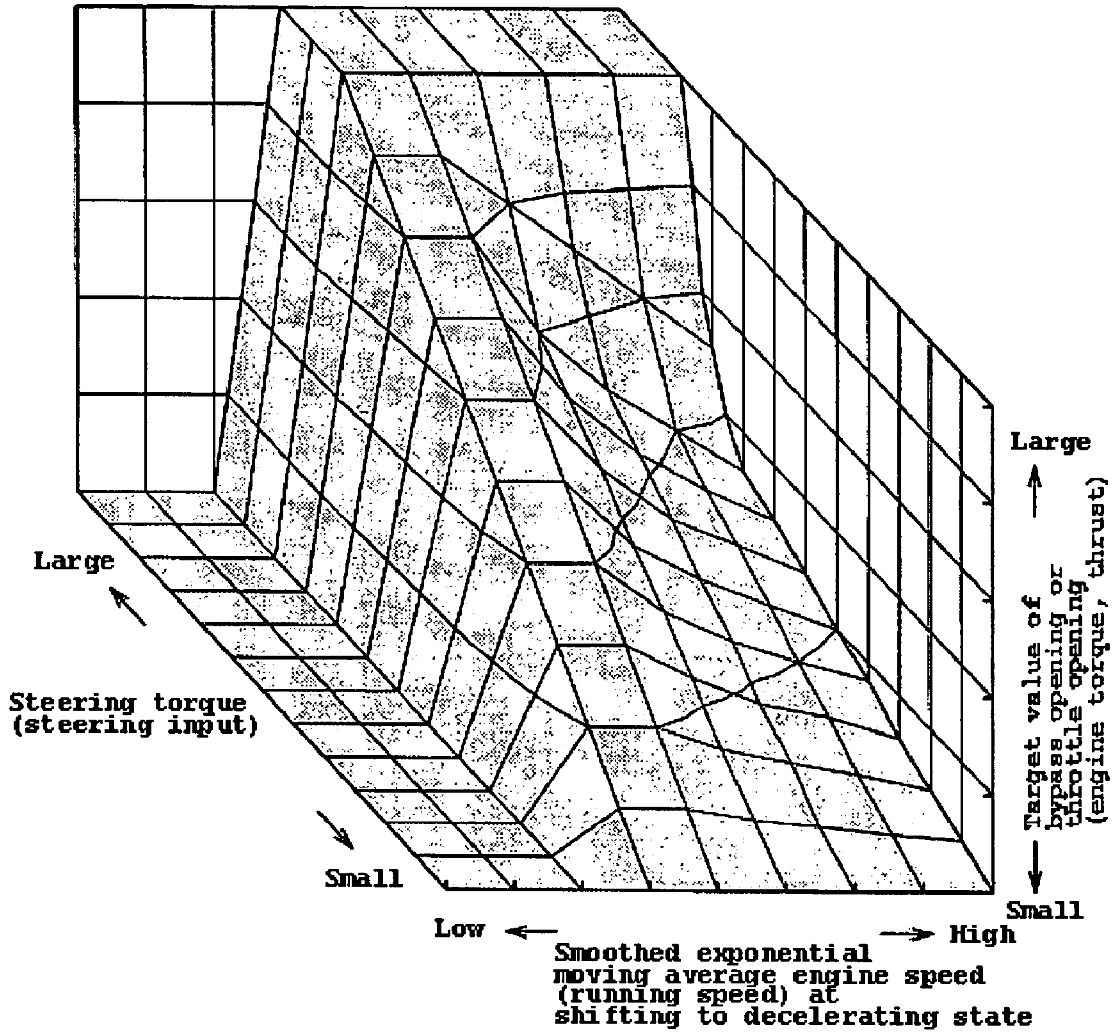
FIG. 11 is a three-dimensional graph illustrating a control map that can be used for a decelerating engine output control process.

When the control system detects a decelerating state at a relatively high rate from the high-speed running state, a target value of the bypass opening associated with the steering torque or engine torque, and therefore the thrust of the boat, are determined based on the control map of FIG. 11. Therefore, the engine speed increases with a slight delay following an increase in steering torque. Because of the fact that the smoothed exponential moving average engine speed or running speed does not immediately fall below the predetermined engine speed for shifting to the initial state, the control of the engine torque or thrust of the boat in accordance with the steering torque is continued.

In a short time, the engine speed generally decreases and the smoothed exponential moving average engine speed or running speed becomes equal to or lower than the predetermined engine speed for shifting to the initial state, thereby completing the off-throttle steering control. A time period from the start to completion is determined by presetting how to smooth the values of the engine speed, that is, presetting the filter constant K in equation (1) above. This tuning helps provide more comfortable steering feeling.

The actuator for controlling the engine output can use an electrically controlled throttle valve, often referred to as a "throttle-by-wire" system, in place of the bypass valve. In such case, the opening of the throttle valve can be regulated by controlling the rotation direction and position of a stepping motor used to control the throttle valve.

The engine to be controlled can also be a two-stroke engine. However, it is more difficult to detect the intake air pressure in two-stroke engines, in particular, negative pressures are more difficult to detect. Thus, the intake air pressure sensor can be eliminated in two-stroke engine embodiments. Additionally, a condition for shifting from the preparation state to the off-throttle steering control state is set either when the absolute value of the rate-of-change in engine speed, at the time when the smoothed exponential moving average engine speed or running speed becomes equal to or lower than the predetermined engine speed for starting the off-throttle steering control, is equal to or greater than the predetermined rate-of-change in engine speed for starting the off-throttle steering control, or when the throttle opening is equal to or lower than the predetermined throttle opening for starting the off-throttle steering control. More specifically, it can be assumed in the case that the absolute value of the rate-of-change in running speed, at the time when the high running speed decreases to a predetermined speed, is equal to or greater than the predetermined value, or that the boat quickly decelerates, or that the throttle valve is closed, the boat shifts from the preparation state to the off-throttle steering control state.

In addition, for the purpose of controlling the engine torque, and therefore the thrust of the boat, the bypass opening or the throttle opening can be regulated. Other than that, various control factors can be preset. The examples include ignition timing, quantity of the fuel to be injected and fuel injection timing.

In some embodiments, the decelerating engine output control, e.g., decelerating engine torque control, and therefore decelerating thrust control are performed at least based on the steering torque (steering force). Thus, in the event abnormalities occur in the steering torque sensor 111 for detecting steering torque or in the values detected by this sensor, the decelerating engine output control can be suspended or prohibited as appropriate.

Figure 13:
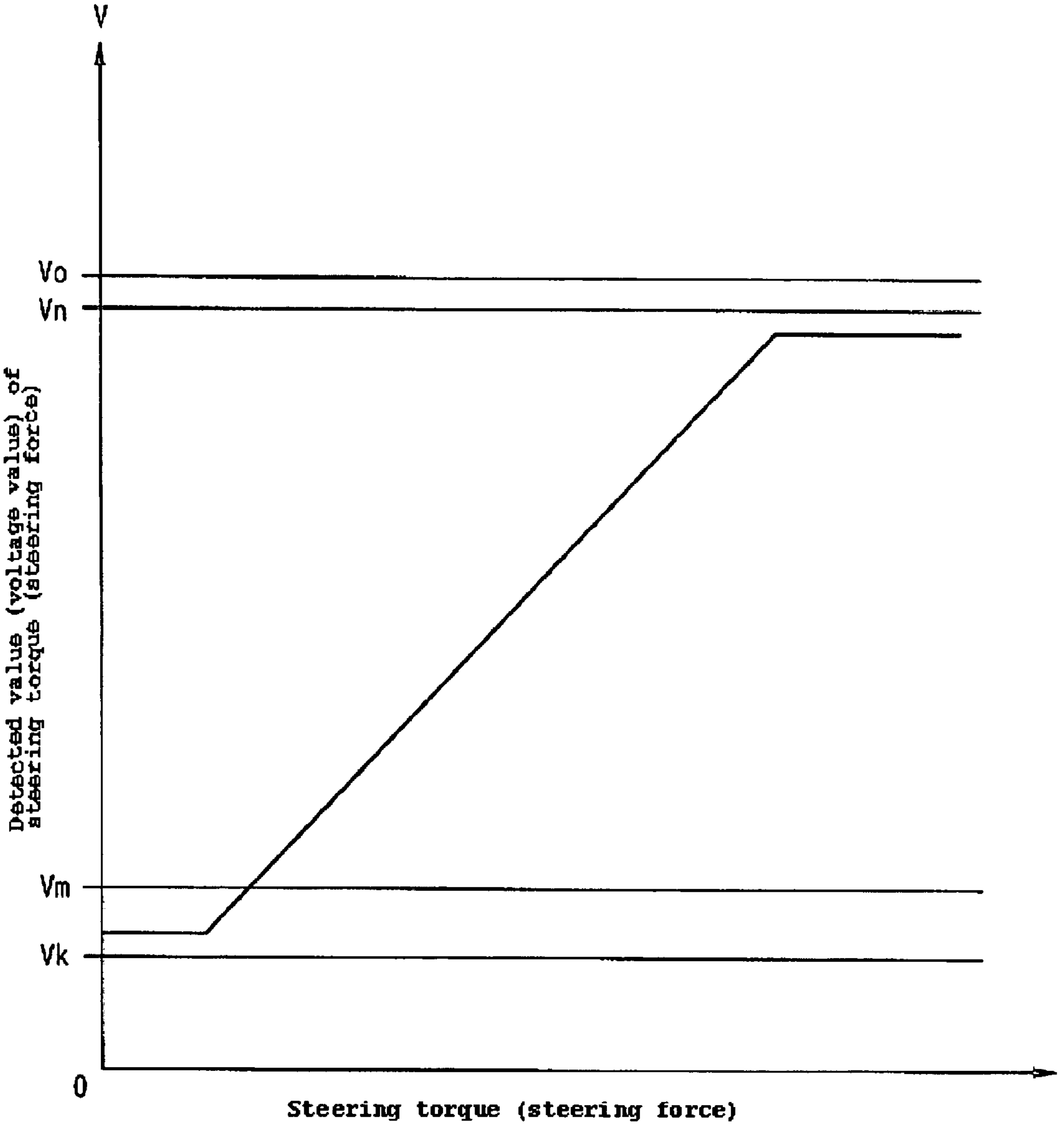
FIG. 13 is an exemplary input/output characteristics chart of a steering torque sensor of FIG. 2.

FIG. 13 shows exemplary but non-limiting input and output characteristics of the steering torque sensor 111 including a load cell. For example, a normal range of value V for steering torque (steering force) detected as a voltage value can be generally between a minimum threshold Vm and maximum threshold Vn. Assuming the voltage value, which includes a slight detection tolerance relative to the minimum threshold Vm, as a second minimum threshold Vk, can be abnormal if the detected value V of the steering torque becomes equal to or lower than the second minimum threshold Vk. Also, assuming the voltage value, which includes a slight detection tolerance relative to the maximum threshold Vn, as a second maximum threshold Vo, can be abnormal if the detected value V of the steering torque becomes equal to or greater than the second maximum threshold Vo. Even though each voltage value or the detected value V of the steering torque would be in a normal range between the minimum threshold Vm and maximum threshold Vn, it could also be conceivably abnormal if an absolute value of variation in detected value V of the steering torque within a predetermine time, for instance, a difference between the first and last detected values of the steering torque within the predetermined time period, is equal to or lower than a given predetermined value. Thus, in some embodiments, when any abnormal value for the steering torque is detected, the decelerating engine output control can be prohibited, and optionally, the alarm lamp 115 comes on and alarm buzzer sounds from the speaker 116 to let the operator know that the decelerating engine output control has been prohibited.

Figure 14:
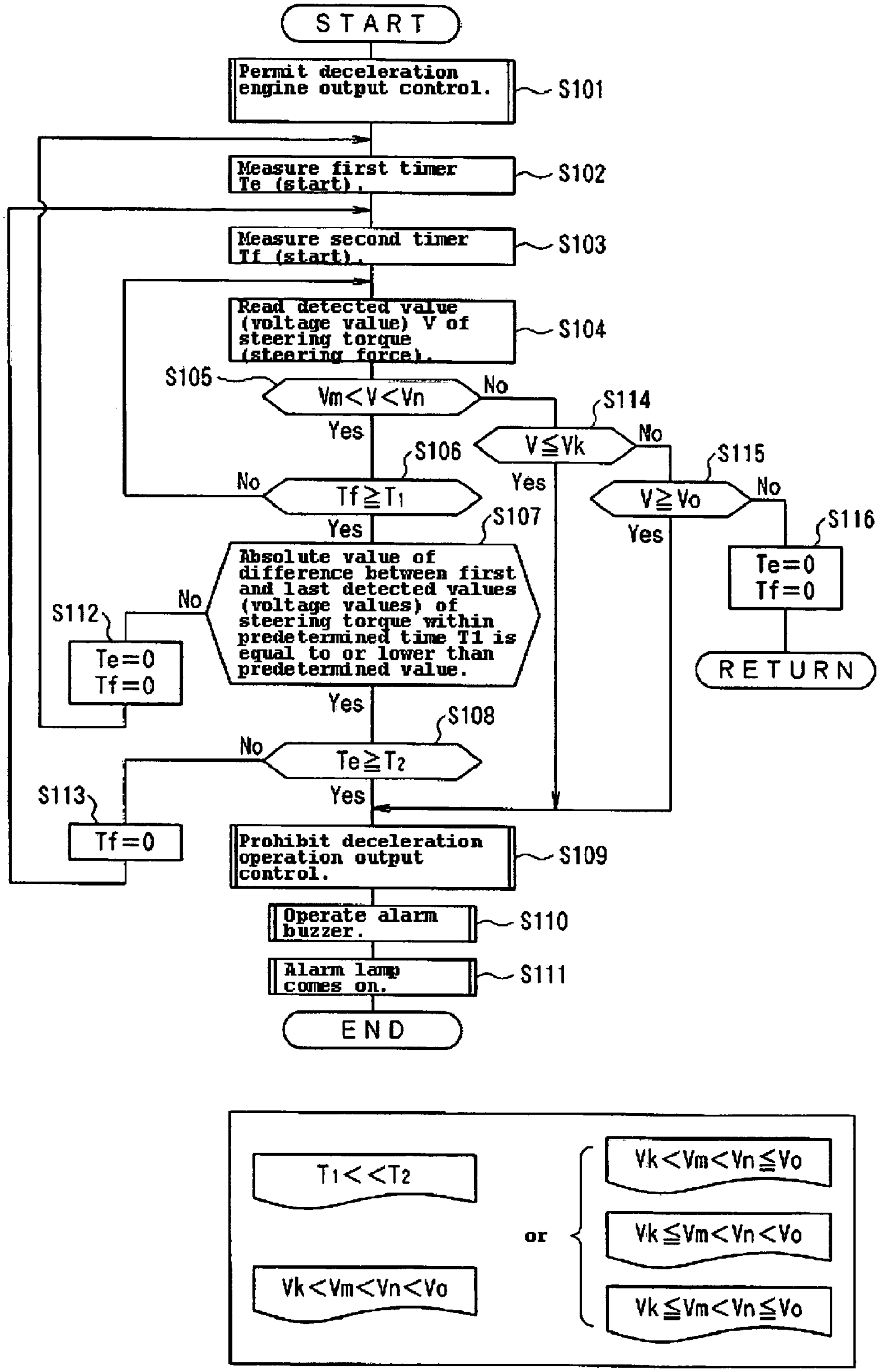
FIG. 14 is a flowchart showing an exemplary operation process that can be used for prohibiting a decelerating engine output control.

FIG. 14 shows an operation process for prohibiting the decelerating engine output control. The operation process of FIG. 14 can be performed any time by timer interrupt in parallel to the operation process for the decelerating engine output control of FIGS. 7 to 10. When the operation process of FIG. 14 prohibits the decelerating engine output control, general engine output control is implemented depending not on the detected value V of the steering torque but on the throttle opening or the like, instead of the decelerating engine output control through the operation process of FIGS. 7 to 10.

The operation process illustrated in FIG. 14 initially permits the decelerating engine output control in the step S101. Specifically, a flag for permitting the decelerating engine output control can be set to permit execution of the decelerating operation output control of FIGS. 7 to 10. The process proceeds to the next step S102 to measure a first timer Te as well as its start time.

The process proceeds to the next step S103 to measure a second timer Tf as well as its start time. The process proceeds to the next step S104 to read a value V of the steering torque (steering force) as a voltage value detected by the steering torque sensor 111.

The process proceeds to the next step S105 to determine whether or not the detected value V of the steering torque read in the step S104 is between the minimum threshold Vm and maximum threshold Vn. If the determination is YES, that is, the detected value V of the steering torque thus obtained is between the minimum threshold Vm and maximum threshold Vn, the process proceeds to the step S106, or if NO, it proceeds to the step S114.

In the step S106, a determination can be made whether or not the second timer Tf indicates equal to or greater than a given predetermined time T1, which is relatively shorter. If the determination is YES, that is, the second time Tf indicates equal to or greater than the predetermined time T1, the process proceeds to the step S107, or if NO, it proceeds to the step S104.

In the step S107, a determination can be made whether or not an absolute value of difference between the first and last detected values of the steering torque (voltage values) within the predetermined time T1 is equal to or lower than the given predetermined value. If the determination is YES, that is, the absolute value of difference between the detected values of the steering torque (voltage values) is equal to or lower than the predetermined value, the process proceeds to the step S108, or if NO, it proceeds to the step S112.

In the step S112, the first timer Te and the second timer Tf are both cleared, and then the process proceeds to the step S102.

In the step S108, a determination can be made whether or not the first timer Te indicates equal to or greater than a given predetermined time T2, which is relatively longer. If the determination is YES, that is, the first time Te indicates equal to or greater than the predetermined time T2, the process proceeds to the step S109, or if NO, it proceeds to the step S113.

In the step S113, the second timer Tf can be cleared, and then the process proceeds to the step S103. In contrast, in the step S114, a determination can be made whether or not the detected value V of the steering torque read in the step S104 is equal to or lower than the second minimum threshold Vk. If the determination is YES, that is, the detected value V of the steering torque thus obtained is equal to or lower than the second minimum threshold Vk, the process proceeds to the step S109, or if NO, it proceeds to the step S115.

In the step S115, a determination can be made whether or not the detected value V of the steering torque read in the step S104 is equal to or greater than the second maximum threshold Vo. If the determination is YES, that is, the detected value V of the steering torque thus obtained is equal to or greater than the second maximum threshold Vo, the process proceeds to the step S109, or if NO, it proceeds to the step S116. In the step S116, the first timer Te and the second timer Tf are both cleared, and then the process proceeds back to the main program.

In the step S109, the decelerating engine output control can be prohibited. Specifically, the flag for permitting the decelerating engine output control is reset to prohibit execution of the decelerating operation output control of FIGS. 7 to 10. The process proceeds to the next step S110 to operate the alarm buzzer to sound through the speaker 116. The process proceeds to the next step S111 to allow the alarm lamp 115 to come on and complete the operation process.

According to the operation process, the decelerating engine output control can be prohibited in either case that the detected value V of the steering torque is equal to or lower than the second minimum threshold Vk, that is, equal to or lower than the minimum threshold Vm within the normal range, or that the detected value V of the steering torque is equal to or greater than the second maximum threshold Vo, that is, equal to or greater than the maximum threshold Vn within the normal range, or that the absolute value of difference between the detected values V of the steering torque within the predetermined time T1 is equal to or lower than the predetermined value even if each detected value V of the steering torque falls within the normal range between the minimum threshold Vm and maximum threshold Vn. This allows the decelerating engine output control to be appropriately prohibited in response to the abnormalities found by the steering force detecting means such as the steering torque sensor 111.

The decelerating engine output control can be also prohibited in the case that the absolute value of difference between the detected values V of the steering torque within the predetermined time T1 has been maintained equal to or lower than the predetermined value for the predetermined time T2 or longer even if each detected value V of the steering torque falls within the normal range between the minimum threshold Vm and maximum threshold Vn. This allows the decelerating engine output control to be further appropriately prohibited in response to the abnormalities found by the steering force detecting means such as the steering torque sensor 111.

The informing means such as the alarm lamp 115 and the speaker 116 can be configured to notify the operator that the decelerating engine output control has been prohibited. In the above embodiment, the second minimum threshold Vk is below the minimum threshold Vm and the second maximum threshold Vo is above the maximum threshold Vn. However, the second minimum threshold Vk and the minimum threshold Vm may be identical with each other, and the second maximum threshold Vo and the maximum threshold Vn may also be identical.

In addition, in order to find abnormalities in the detected values of the steering torque by determining if variation in detected values of the steering torque within the predetermined time is equal to or lower than the predetermined value, the fact that all or a preset number of detected values of the steering torque, sampled per predetermined time, fall within the predetermined value range may be used.

Further, in the case that the detected value V of the steering torque is below the minimum threshold Vm, if the detected value V of the steering torque could exceed the minimum threshold Vm, then it may satisfy the condition for performing the decelerating engine output control.

In the aforementioned embodiment, the steering torque (steering force) and the running speed (or engine speed) are used for the decelerating engine output control. However, any combination of any factor with the steering torque (steering force) for the decelerating engine output control can be used with the embodiments disclosed herein.

It is to be noted that the present engine output control system can be in the form of a hard-wired feedback control circuit. Alternatively, the engine output control system can be constructed of a dedicated processor and a memory for storing a computer program configured to perform the processes illustrated in FIGS. 5-10 and 14. Additionally, the engine output control system can be constructed of a general purpose computer having a general purpose processor and the memory for storing the computer program for performing the processes illustrated in FIGS. 5-10 and 14. Preferably, however, the engine output control system is incorporated into the engine control unit 15, in any of the above-mentioned forms.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine output control system for a watercraft configured to be propelled by an engine-driven jet propulsion unit configured to eject water from a nozzle, the control system comprising a steering force detecting means for detecting a steering force applied by an operator, a decelerating state determining means for determining if the watercraft is in a predetermined decelerating state, a decelerating engine output control means for controlling decelerating engine output based on the steering force detected by the steering force detecting means, when the decelerating state determining means determines that the watercraft is in the predetermined decelerating state, and a decelerating engine output control prohibiting means for prohibiting the decelerating engine output control means from decelerating engine output control when the steering force detected by the steering force detecting means falls within a normal range between a maximum threshold and minimum threshold, and variation in steering force detected by the steering force detecting means within a predetermined time period is equal to or lower than a given predetermined value.

2. The engine output control system for a watercraft according to claim 1, wherein the decelerating engine output control prohibiting means prohibits the decelerating engine output control means from decelerating engine output control, when the steering force detected by the steering force detecting means falls xxithin a normal range between the maximum threshold and minimum threshold, and variation in steering force detected by the steering force detecting means within the predetermined time period has been maintained equal to or lower than the given predetermined value for a given predetermined time period different from the aforementioned predetermined time period.

3. The engine output control system for a watercraft according to claim 1, wherein the decelerating engine output control prohibiting means prohibits the decelerating engine output control means from decelerating engine output control, when the steering force detected by the steering force detecting means is equal to or greater than a second maximum threshold, that is equal to or greater than the maximum threshold, or equal to or lower than a second minimum threshold, that is equal to or lower than the minimum threshold.

4. The engine output control system for a watercraft according to claim 2, wherein the decelerating engine output control prohibiting means prohibits the decelerating engine output control means from decelerating engine output control, when the steering force detected by the steering force detecting means is equal to or greater than a second maximum threshold, that is equal to or greater than the maximum threshold, or equal to or lower than a second minimum threshold, that is equal to or lower than the minimum threshold.

5. The engine output control system for a watercraft according to claim 1, wherein the decelerating engine output control prohibiting means comprises an informing means for informing an operator that the decelerating engine output control has been prohibited.

6. The engine output control system for a watercraft according to claim 2, wherein the decelerating engine output control prohibiting means comprises an informing means for informing an operator that the decelerating engine output control has been prohibited.

7. The engine output control system for a watercraft according to claim 3, wherein the decelerating engine output control prohibiting means comprises an informing means for informing an operator that the decelerating engine output control has been prohibited.

8. The engine output control system for a watercraft according to claim 4, wherein the decelerating engine output control prohibiting means comprises an informing means for informing an operator that the decelerating engine output control has been prohibited.

9. An engine output control system for a watercraft configured to be propelled by an engine-driven jet propulsion unit configured to eject water from a nozzle and including a steering member, the control system comprising a steering force sensor configured to detect a steering force applied to the steering member by an operator, a decelerating state determining module configured to determine if the watercraft is in a predetermined decelerating state, a decelerating engine output control module configured to control the engine output based on the steering force detected by the steering force sensor, when the decelerating state determining module determines that the watercraft is in the predetermined decelerating state, and a decelerating engine output control prohibiting module configured to prohibit the decelerating engine output control module from decelerating engine output control when the output from the steering force sensor falls within a normal range between a maximum threshold and minimum threshold, and variation in steering force detected by the steering force sensor within a predetermined time period is equal to or lower than a given predetermined value.

10. The engine output control system for a watercraft according to claim 9, wherein the decelerating engine output control prohibiting module is configured to prohibit the decelerating engine output control module from decelerating engine output control, when the steering force detected by the steering force sensor falls within a normal range between the maximum threshold and minimum threshold, and variation in steering force detected by the steering force sensor within the predetermined time period has been maintained equal to or lower than the given predetermined value for a given predetermined time period different from the aforementioned predetermined time period.

11. The engine output control system for a watercraft according to claim 9, wherein the decelerating engine output control prohibiting module is configured to prohibit the decelerating engine output control module from decelerating engine output control, when the steering force detected by the steering force sensor is equal to or greater than a second maximum threshold, that is equal to or greater than the maximum threshold, or equal to or lower than a second minimum threshold, that is equal to or lower than the minimum threshold.

12. The engine output control system for a watercraft according to claim 10, wherein the decelerating engine output control prohibiting module is configured to prohibit the decelerating engine output control module from decelerating engine output control, when the steering force detected by the steering force sensor is equal to or greater than a second maximum threshold, that is equal to or greater than the maximum threshold, or equal to or lower than a second minimum threshold, that is equal to or lower than the minimum threshold.

13. The engine output control system for a watercraft according to claim 9, wherein the decelerating engine output control module comprises an informing device configured to notify an operator that the decelerating engine output control has been prohibited.

14. The engine output control system for a watercraft according to claim 10, wherein the decelerating engine output control module comprises an informing device configured to notify an operator that the decelerating engine output control has been prohibited.

15. The engine output control system for a watercraft according to claim 11, wherein the decelerating engine output control module comprises an informing device configured to notify an operator that the decelerating engine output control has been prohibited.

16. The engine output control system for a watercraft according to claim 12, wherein the decelerating engine output control module comprises an informing device configured to notify an operator that the decelerating engine output control has been prohibited.

* * * * *

UNITED STATES PATENT AND TRADEMARK OFFICE

CERTIFICATE OF CORRECTION

PATENT NO. : 7,364,480 B2
APPLICATION NO. : 11/169374
DATED : April 29, 2008
INVENTOR(S) : Kazumasa Ito et al.

It is certified that error appears in the above-identified patent and that said Letters Patent is hereby corrected as shown below:

On title page item (73), (Assignee), line 2, Delete “Shizouka” and insert -- Shizuoka --, therefor.

On column 2, line 65, After “water” insert -- jet --.

On column 11, line 63 (Approx.), Delete “precess” and insert -- process --, therefor.

On column 12, line 4, After “state” insert -- , --.

On column 18, line 24, In Claim 2, Delete “xxithin” and insert -- within --, therefor.

Signed and Sealed this

Eleventh Day of November, 2008

JON W. DUDAS
*Director of the United States Patent and Trademark Office*